US010967929B2

(12) United States Patent
Brudeli

(10) Patent No.: US 10,967,929 B2
(45) Date of Patent: Apr. 6, 2021

(54) LEANING VEHICLE

(71) Applicant: Brudeli Tech Holding AS, Hokksund (NO)

(72) Inventor: Geir Brudeli, Hokksund (NO)

(73) Assignee: Brudeli Tech Holding AS, Hokksund (NO)

( * ) Notice: Subject to any disclaimer, the term of this patent is extended or adjusted under 35 U.S.C. 154(b) by 163 days.

(21) Appl. No.: 16/090,834

(22) PCT Filed: May 11, 2017

(86) PCT No.: PCT/EP2017/061361
§ 371 (c)(1),
(2) Date: Oct. 3, 2018

(87) PCT Pub. No.: WO2017/194686
PCT Pub. Date: Nov. 16, 2017

(65) Prior Publication Data
US 2019/0106174 A1 Apr. 11, 2019

(30) Foreign Application Priority Data

May 13, 2016 (NO) .................................... 20160819

(51) Int. Cl.
*B62K 5/05* (2013.01)
*B62K 5/08* (2006.01)
(Continued)

(52) U.S. Cl.
CPC ............ *B62K 25/04* (2013.01); *B60G 21/007* (2013.01); *B62D 9/02* (2013.01); *B62K 5/027* (2013.01);
(Continued)

(58) Field of Classification Search
CPC . B62D 5/027; B62D 5/05; B62D 5/08; B62D 5/10; D62D 9/02
See application file for complete search history.

(56) References Cited

U.S. PATENT DOCUMENTS 4,006,916 A * 2/1977 Patin ........................ B62D 9/02
                                                    280/282
6,104,154 A * 8/2000 Harada .................. B62K 5/027
                                                    280/255
(Continued)

FOREIGN PATENT DOCUMENTS

FR          989689 A     9/1951
GB        2382334 A      5/2003
(Continued)

*Primary Examiner* — Barry Gooden, Jr.
(74) *Attorney, Agent, or Firm* — Christian D. Abel

(57) ABSTRACT

The present invention provides a leaning vehicle comprising a leaning frame (1), a front suspension assembly (2), an undercarriage element (3), a rear suspension assembly (4) and a motor (10), wherein the leaning frame (1) comprises a straddle seat (5) and a hand steering element (6), the hand steering element operatively connected to the front suspension assembly (2); the undercarriage element comprises a front section (7) and a rear section (8), and is connected to a suspension connecting element (9); the front suspension assembly (2) comprises two ground engaging members (13) and at least one shock absorber (20), and is connected to the leaning frame (1) and the suspension connecting element, such that the ground engaging members (13) of the front suspension assembly will tilt in the same direction as the leaning frame; the rear suspension assembly (4) comprises at least one rear ground engaging member (23) and is connected to the rear section (8) of the undercarriage element; wherein the leaning frame (1) is pivotally connected to the undercarriage element (3), such that the leaning frame and the two ground engaging members may tilt in a sideways (Continued)

direction relative to the undercarriage element, the rear ground engaging member and the rear suspension assembly.

8 Claims, 24 Drawing Sheets

(51) Int. Cl.
*B62K 5/10* (2013.01)
*B62K 25/04* (2006.01)
*B62D 9/02* (2006.01)
*B60G 21/00* (2006.01)
*B62K 5/027* (2013.01)
*B62K 5/06* (2006.01)
B62K 5/01 (2013.01)
B62K 25/28 (2006.01)
B62K 5/00 (2013.01)
*B62M 27/02* (2006.01)

(52) U.S. Cl.
CPC ............... *B62K 5/05* (2013.01); *B62K 5/06* (2013.01); *B62K 5/08* (2013.01); *B62K 5/10* (2013.01); *B60G 2300/122* (2013.01); *B60G 2300/322* (2013.01); *B60G 2300/45* (2013.01); *B62K 5/01* (2013.01); *B62K 25/28* (2013.01); *B62K 2005/001* (2013.01); *B62K 2204/00* (2013.01); *B62M 27/02* (2013.01); *B62M 2027/025* (2013.01)

(56) References Cited

U.S. PATENT DOCUMENTS

| | | | |
|---|---|---|---|
| 6,863,288 B2 * | 3/2005 | Van Den Brink | B60G 21/007 280/124.103 |
| 7,543,829 B1 * | 6/2009 | Barnes | B62K 5/10 280/62 |
| 7,648,148 B1 | 1/2010 | Mercier | |
| 7,722,063 B2 * | 5/2010 | Dieziger | B60G 3/20 280/124.103 |
| 9,701,339 B2 * | 7/2017 | Krammel | B62K 5/01 |
| 10,577,044 B1 * | 3/2020 | Kejha | B60K 6/26 |
| 2003/0102176 A1 * | 6/2003 | Bautista | B60G 21/007 180/210 |
| 2004/0051269 A1 | 3/2004 | Bouton | |
| 2004/0100059 A1 * | 5/2004 | Van Den Brink | B60G 21/007 280/124.103 |
| 2006/0049597 A1 * | 3/2006 | Chan | B62D 1/02 280/93.504 |
| 2006/0097471 A1 * | 5/2006 | Van Den Brink | B62J 25/00 280/124.103 |
| 2006/0255550 A1 | 11/2006 | Pfeil et al. | |
| 2007/0152422 A1 * | 7/2007 | Lin | B62K 5/02 280/275 |
| 2008/0100018 A1 | 5/2008 | Dieziger | |
| 2009/0194961 A1 * | 8/2009 | Dieziger | B60G 3/20 280/124.103 |
| 2010/0032914 A1 | 2/2010 | Hara et al. | |
| 2010/0127471 A1 | 5/2010 | Gazarek | |
| 2011/0006498 A1 | 1/2011 | Mercier | |
| 2013/0062133 A1 * | 3/2013 | Budweil | B62D 7/14 180/209 |
| 2013/0119629 A1 * | 5/2013 | Lee | B62K 5/08 280/124.117 |
| 2013/0131923 A1 * | 5/2013 | Tzipman | B62D 24/04 701/38 |
| 2013/0168934 A1 * | 7/2013 | Krajekian | B62K 5/05 280/62 |
| 2016/0137251 A1 * | 5/2016 | Mercier | B60G 13/005 180/210 |
| 2018/0257731 A1 * | 9/2018 | Kanehara | F16D 55/28 |
| 2018/0265155 A1 * | 9/2018 | Raffaelli | B62K 5/08 |

FOREIGN PATENT DOCUMENTS

| | | |
|---|---|---|
| WO | WO05/02957 A | 1/2005 |
| WO | WO05/02957 A1 | 1/2005 |

* cited by examiner

LEANING VEHICLE

FIELD OF THE INVENTION

The present invention relates to the field of leaning vehicles, and in particular to motorized leaning vehicles.

BACKGROUND

Leaning vehicles (also known as tilting vehicles) having 3 or 4 wheels are well known. A common feature of such vehicles is the presence of two front wheels connected such that both front wheels lean in the same direction when the leaning vehicle is tilted in a sideways direction. Leaning vehicles have a number of advantages in that two front wheels increase the braking efficiency, i.e. reduced stopping length, and further in that the risk of front wheel slip is substantially reduced. The latter is a common cause of motorcycle/scooter accidents.

Balancing the weight of vehicles during low speed maneuvering, especially those with a high Centre of Gravity (CoG), is a known problem for leaning vehicles having 3 or 4 wheels. Leaning vehicle with 3 or 4 wheels will typically have a higher total mass than a comparable 2-wheeler (motorcycles/scooters), and the problem of weight balancing is thus even more noticeable.

The weight balancing problems are also applicable to snowmobiles and snow bikes having a pair of front skis and a rear belt drive.

It is also desirable to add more functionality to such leaning 3 or 4 wheel vehicles. Such functionality includes weather protection like a front window and safety by adding a rollover protection/cage. This may in the largest extent of the solution be a fully enclosed cabin providing a driver/passenger compartment to the vehicle. A major problem with such extensive additions is an even higher CoG, and consequently, an increased problem of balancing the weight of the vehicle.

Although the weight balancing problem is more pronounced for large and/or enclosed leaning vehicles, it is also relevant for small and open 3 or 4 wheelers.

A further issue with leaning vehicles, is that the presence of three or four rotating wheels, as opposed to two in a common motorcycle, provides an increased resistance towards change of the tilt angle of the vehicle due to the increased total moment of inertia.

WO 2005/002957 A1 discloses a leaning vehicle comprising footboards on which the weight of the tilting part of the vehicle may be balanced. However, the force needed to balance the total weight is quite high and the use of footboards is not an ideal solution for most people.

The present invention provides a leaning vehicle, wherein at least some of the disadvantages of present leaning vehicles are avoided or alleviated.

SUMMARY OF THE INVENTION

The present invention is defined by the attached claims and in the following:

In a first embodiment, the present invention provides leaning vehicle comprising a leaning frame, a front suspension assembly, an undercarriage element, a rear suspension assembly and a motor, wherein
- the leaning frame comprises a straddle seat and a hand steering element, the hand steering element operatively connected to the front suspension assembly;
- the undercarriage element comprises a front section and a rear section, and is connected to a suspension connecting element;
- the front suspension assembly comprises two ground engaging members and at least one shock absorber, and is connected to the leaning frame and the suspension connecting element, such that the ground engaging members of the front suspension assembly will tilt in the same direction as the leaning frame;
- the rear suspension assembly comprises at least one rear ground engaging member and is connected to the rear section of the undercarriage element;

wherein
the leaning frame is pivotally connected to the undercarriage element, such that the leaning frame and the two ground engaging members may tilt (i.e. pivot) in a sideways direction relative to, and/or independent of, the undercarriage element, the rear suspension assembly and the rear ground engaging member, or alternatively such that the leaning frame may pivot or tilt relative to, and/or independent of, the undercarriage element, the rear suspension assembly and the rear ground engaging member, between a first position in which the ground engaging members of the front suspension assembly are tilted in a first direction and a second position in which the ground engaging members of the front suspension assembly is tilted in a second direction opposite the first direction.

In other words, due to the pivot connection between the leaning frame and the undercarriage element, the leaning frame, and consequently the ground engaging members of the front suspension assembly, may be tilted in a sideways direction while the undercarriage element and the rear ground engaging member remain substantially unaffected, i.e. the undercarriage element and the rear ground engaging member do not follow the sideways movement of the leaning frame.

Further, by having the front suspension assembly connected to both the leaning frame and the suspension connecting element, the latter via the at least one shock absorber, the undercarriage element is kept in balance by the two front ground engaging members and prevented from tilting in a sideways direction. In other words, the front suspension assembly is connected to the leaning frame and the suspension connecting element, the latter via the at least one shock absorber, such that the undercarriage element is kept in balance by the two front ground engaging members.

In a preferred embodiment of the leaning vehicle, the motor is arranged on the undercarriage element or is a part of the rear suspension assembly. The motor is arranged or connected to the undercarriage element or the rear suspension assembly such that the motor will follow the movement of the undercarriage element and/or the rear suspension assembly. In other words, the motor is arranged on the leaning vehicle such that the leaning frame and the front suspension assembly may tilt without tilting the motor.

In a preferred embodiment, the front suspension assembly is connected to the suspension connecting element by the at least one shock absorber.

In a further preferred embodiment, the front suspension assembly comprises two shock absorbers and is connected to the suspension connecting element by the two shock absorbers.

In a further embodiment of the leaning vehicle, the front suspension assembly comprises at least one lower suspension arm, at least one upper suspension arm and at least one shock absorber, wherein the at least one upper suspension arm is pivotally connected to the leaning frame.

In a further embodiment of the leaning vehicle, the front suspension assembly comprises two lower suspension arms, two upper suspension arms and two shock absorbers, wherein each of the upper suspension arms is pivotally connected to the leaning frame.

In yet a further embodiment of the leaning vehicle, the front suspension assembly comprises a front left suspension assembly and a front right suspension assembly, and each of the front left suspension assembly and the front right suspension assembly comprises:
- one of the ground engaging members;
- one lower suspension arm and one upper suspension arm, each suspension arm comprises a first end and a second end, the second end pivotally connected to the ground engaging member;
- the first end of the upper suspension arm is pivotally connected to the leaning frame; and
- one shock absorber operatively connected to the suspension connecting element and the lower or upper suspension arm.

The suspension connecting element is arranged to provide a connection between the at least one shock absorber of the front suspension assembly and the undercarriage element. The connection between the suspension connecting element and the undercarriage element is rigid/fixed or pivotable, depending on the design of the suspension connecting element. For instance, when the suspension connecting element is a shock tower, the connection is substantially rigid/fixed, but may allow a few degrees, 0-5 degrees, sideways movement relative to the undercarriage element, i.e. the connection between the suspension connecting element and the undercarriage element is substantially rigid. In other embodiments, for instance when the suspension connecting element comprises a tiltable horizontal beam connecting the upper ends of two shock absorbers as described below, the connection between the suspension connecting element and the undercarriage element is pivotable. By having the undercarriage element connected to the at least one shock absorber of the front suspension assembly via the suspension connecting element, the undercarriage element is kept in balance by the two front ground engaging members and prevented from tilting. In the absence of a connection between the suspension connecting element and the undercarriage element, the undercarriage element would only be balanced on the rear ground engaging member.

In a further embodiment of the leaning vehicle, the shock absorber has one end, preferably an upper end, operatively connected to the suspension connecting element and another end, preferably a lower end, connected to the lower or upper suspension arm.

In a further embodiment of the leaning vehicle the suspension connecting element is a shock tower comprising a lower section and an upper section, the lower section connected at the front section of the undercarriage element, and wherein the upper end of the shock absorber is pivotally connected to the upper section of the shock tower. Preferably, the lower section is rigidly connected at the front section of the undercarriage element. However, the lower section may also be connected at the front section such that the shock tower is allowed to pivot a few degrees, e.g. up to 5°, in the same direction as the leaning frame when the leaning frame is tilted.

In a further embodiment of the leaning vehicle, a lower end of the shock absorber is pivotally connected to the lower suspension arm.

In a further embodiment of the leaning vehicle the rear suspension assembly comprises a shock absorber.

In a further embodiment of the leaning vehicle, the first end of the lower suspension arm is pivotally connected to the leaning frame or the undercarriage element.

In a further embodiment of the leaning vehicle, the ground engaging members of the front suspension assembly and the rear ground engaging member are wheels, or the ground engaging members of the front suspension assembly are skis, and the rear ground engaging member is a drive belt.

In a further embodiment, the leaning vehicle comprises footboards connected to the undercarriage element.

In a further embodiment, the leaning vehicle comprises a first and a second pivot coupling between the leaning frame and the undercarriage element, preferably the first pivot coupling and the second pivot coupling are arranged on opposite sides of the suspension connecting element.

In a further embodiment of the leaning vehicle, the first pivot coupling is arranged at a position between the motor and the suspension connecting element, and the second pivot coupling is preferably arranged at the front section.

In a further embodiment of the leaning vehicle, the rear suspension assembly is pivotably connected to the rear section of the undercarriage element, such that the rear suspension assembly may pivot in a vertical plane.

In a further embodiment, the leaning vehicle comprises a tilting actuator operationally connected to the leaning frame, preferably via a shaft of the first or the second pivot coupling.

In a further embodiment of the leaning vehicle, the tilting actuator is connected to the undercarriage element.

In a further embodiment, the leaning vehicle comprises protective means, such as a windshield, a roll-over cage and/or a canopy, connected to the leaning frame.

In a further embodiment of the leaning vehicle, the lower and the upper suspension arms are A-arms, each A-arm having a pair of first ends, and a second end connected to one of the ground engaging members. The pair of first ends are usually connected to the ground engaging member via a spindle.

In a further embodiment of the leaning vehicle, the first ends, of the lower and upper suspension arms of the front left suspension assembly, are connected at a position closer to the second ends, of the corresponding lower and upper suspension arms of the front right assembly, than to the position at which the first ends of the lower and upper suspension arms of the front right suspension assembly are connected, and vice versa. Vice versa is intended to mean that the first ends, of the lower and upper suspension arms of the front right suspension assembly, are connected at a position closer to the second ends, of the corresponding lower and upper suspension arms of the front left assembly, than to the position at which the first ends of the lower and upper suspension arms of the front left suspension assembly are connected.

In an embodiment of the leaning vehicle, the suspension connecting element is preferably fixed/rigidly connected to the undercarriage element. However, the suspension connecting element may also be substantially rigidly connected in that a limited movement of the suspension connecting element relative the undercarriage element is allowed, for instance within a range of 0-5 degrees, or the suspension connecting element is pivotably connected to the undercarriage element. The type of connection, i.e. rigid or pivotable, depends on the design of the suspension connecting element.

In a further embodiment of the leaning vehicle, the rear suspension assembly is pivotably connected to the rear section of the undercarriage element, such that the rear suspension assembly may pivot in a vertical plane, said vertical plane being substantially perpendicular to the plane in which the leaning frame tilts.

In a further embodiment of the leaning vehicle, the motor is operationally connected to the rear ground engaging member. The motor may be a combustion engine or an electric motor. A fuel tank and/or batteries may be arranged on the tilting frame and/or the undercarriage element, preferably the undercarriage element.

The term «leaning vehicle», also known as «tilting vehicle» is intended to mean a vehicle having a front suspension assembly which comprises two ground engaging members, wherein the front suspension assembly is connected to a frame such that the two ground engaging members will tilt in the same direction as the frame, when the frame is tilted, while keeping contact with the ground.

The term "suspension connecting element" is intended to define any unit, element or assembly, arranged to provide a suitable connection between the undercarriage element and the at least one shock absorber of the front suspension assembly, i.e. the term may also be a "front suspension connecting element".

SHORT DESCRIPTION OF THE DRAWINGS

Embodiments of the invention are described in detail by reference to the following drawings.

DETAILED DESCRIPTION OF THE INVENTION

Figure 1:
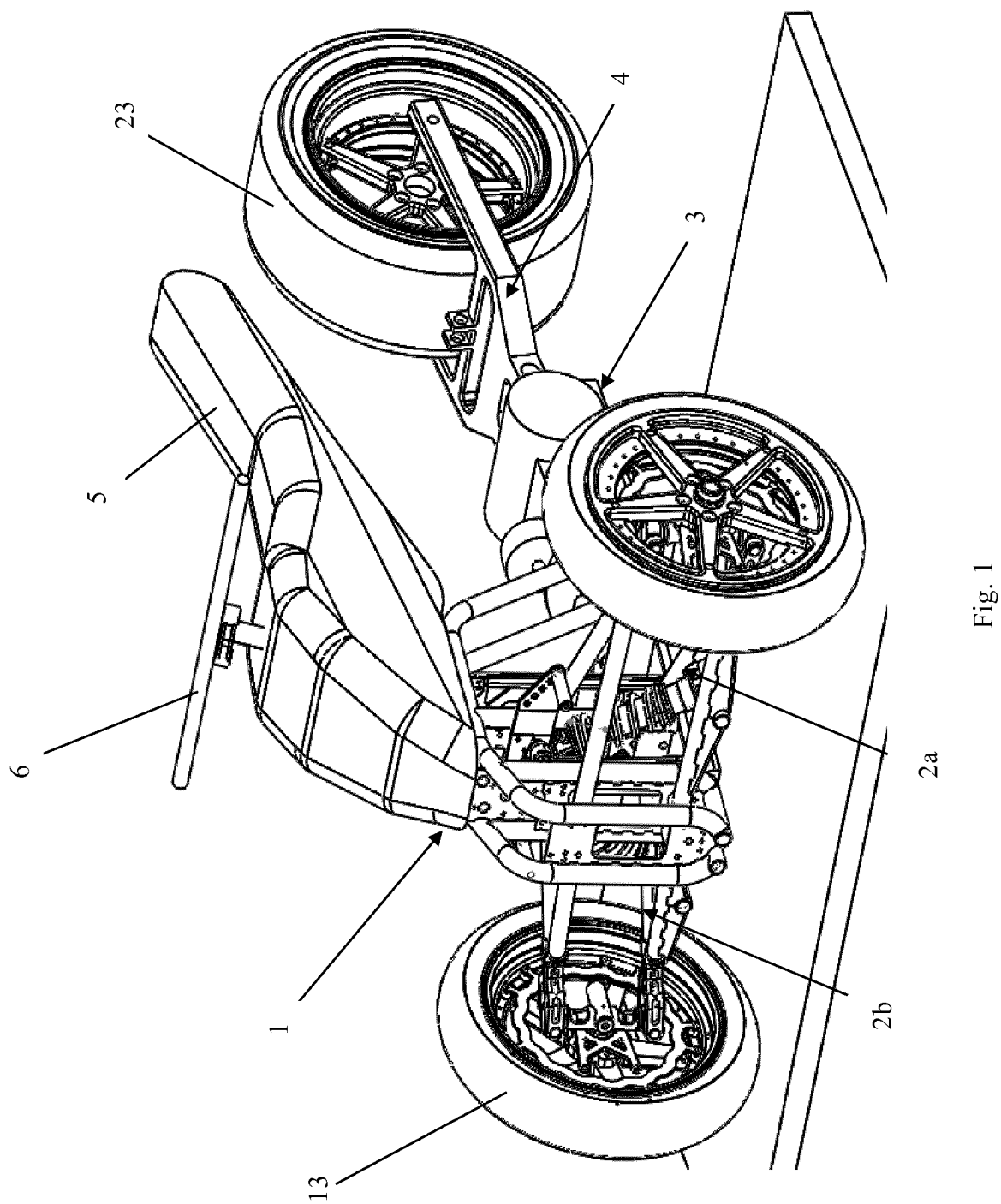
FIG. 1 is a perspective front view of one embodiment of a leaning vehicle according to the invention.
Figure 2:
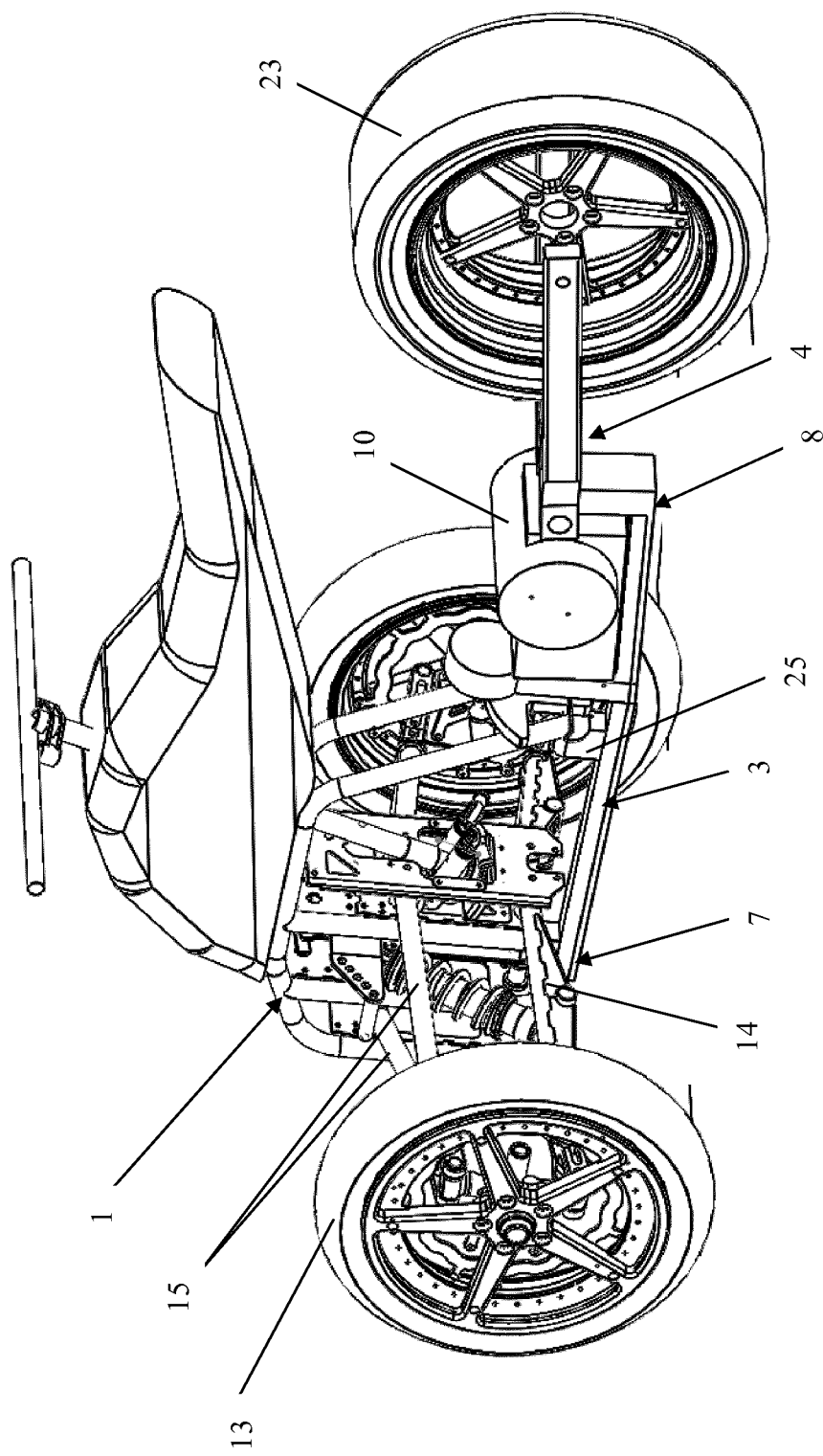
FIG. 2 is a perspective rear view of the embodiment in FIG. 1.

The present invention alleviates or minimizes at least some of the known disadvantages of the prior art leaning vehicles. For instance, the above-mentioned weight balancing problem is alleviated by providing a leaning vehicle, wherein the heaviest parts of the vehicle, in particular the motor, is arranged on a stabilized undercarriage element which will not lean or tilt together with a leaning frame operationally connected to two front wheels (i.e. ground engaging members), the two front wheels are connected such that both will lean in the same direction when the leaning frame is tilted in a sideways direction. In this manner, the handling of the leaning vehicle will be much easier, especially when maneuvering at low speed. The invention is described in detail by reference to leaning vehicles having specific front suspension assemblies and suspension connecting elements as described below. However, the invention is not restricted to any specific type of front suspension assembly or suspension connecting element, and based on the present disclosure a skilled person is considered capable of modifying other designs, for example those disclosed in EP 3002200 A1, US 2012/248717A1, US 2006/0255550 or WO 2010/015986 A1, to obtain a vehicle according to the present invention without any inventive effort.

A first embodiment of a leaning vehicle according to the invention is shown in FIGS. 1-5. The leaning vehicle, see FIGS. 1 and 2, comprises a leaning frame 1 having a handlebar 6 (i.e. a hand steering element) and a straddle seat 5. The leaning frame is operationally connected to a front left suspension assembly 2a and a front right suspension assembly 2b (or simply a front suspension assembly 2). Each of the front left suspension assembly 2a and the front right suspension assembly 2b comprises a lower suspension arm 14, an upper suspension arm 15 and a wheel (i.e. a ground engaging member), and are arranged such that both wheels will tilt in the same direction as the leaning frame when said frame pivots or tilts in a sideways direction. The leaning frame is further pivotally connected to an undercarriage element 3 by two pivot couplings 25, 26 (see also FIG. 5). The undercarriage element 3 is connected to a rear suspension assembly 4 comprising a rear wheel (i.e. a rear ground engaging element), such that the leaning frame, and consequently the two front wheels 13, may move in a sideways direction independent of the undercarriage element and the rear wheel. The undercarriage element comprises a front section 7, a rear section 8 and a motor 10, see FIG. 2. By arranging the motor 10 on the undercarriage element the weight of the leaning frame is lowered and much less force is required to tilt the leaning frame in a sideways direction. This feature is especially important during low speed maneuvering when the mass/weight that need to be balanced is most noticeable; at higher speeds the centrifugal forces will counter the gravitational force acting on the leaning frame. The rear suspension assembly is connected to the rear section 8 of the undercarriage element such that the rear wheel may move in a vertical direction independent of the undercarriage element. In the present description, the rear suspension assembly is described as a separate element connected to the undercarriage element, however, in other embodiments the suspension assembly may be an integral part of the undercarriage element provided the rear wheel is allowed to move in a vertical direction dampened by a shock absorber.

Figure 3:
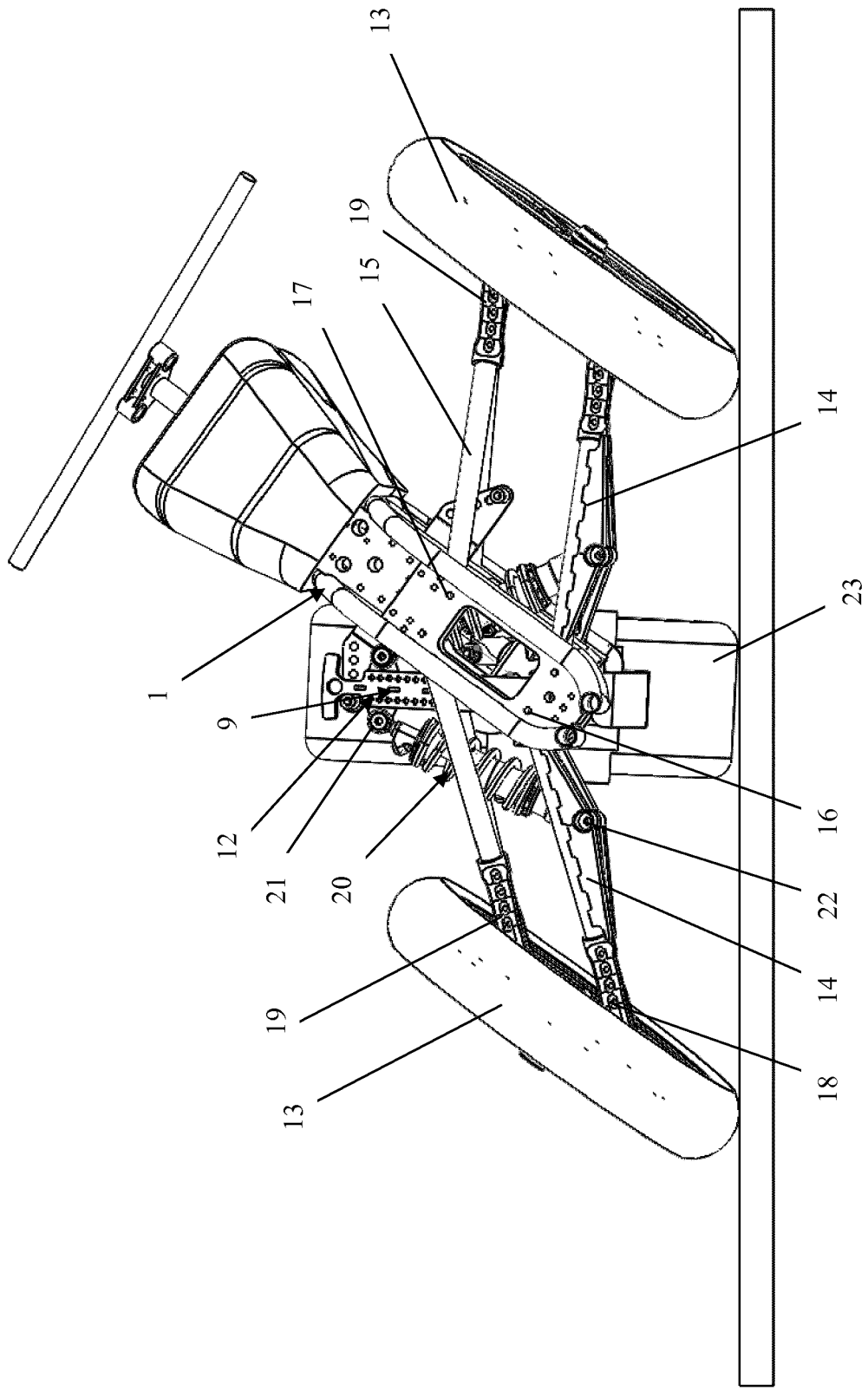
FIG. 3 is a front view of the embodiment of FIGS. 1 and 2, wherein the vehicle is leaning to the left from a driver perspective.
Figure 4:
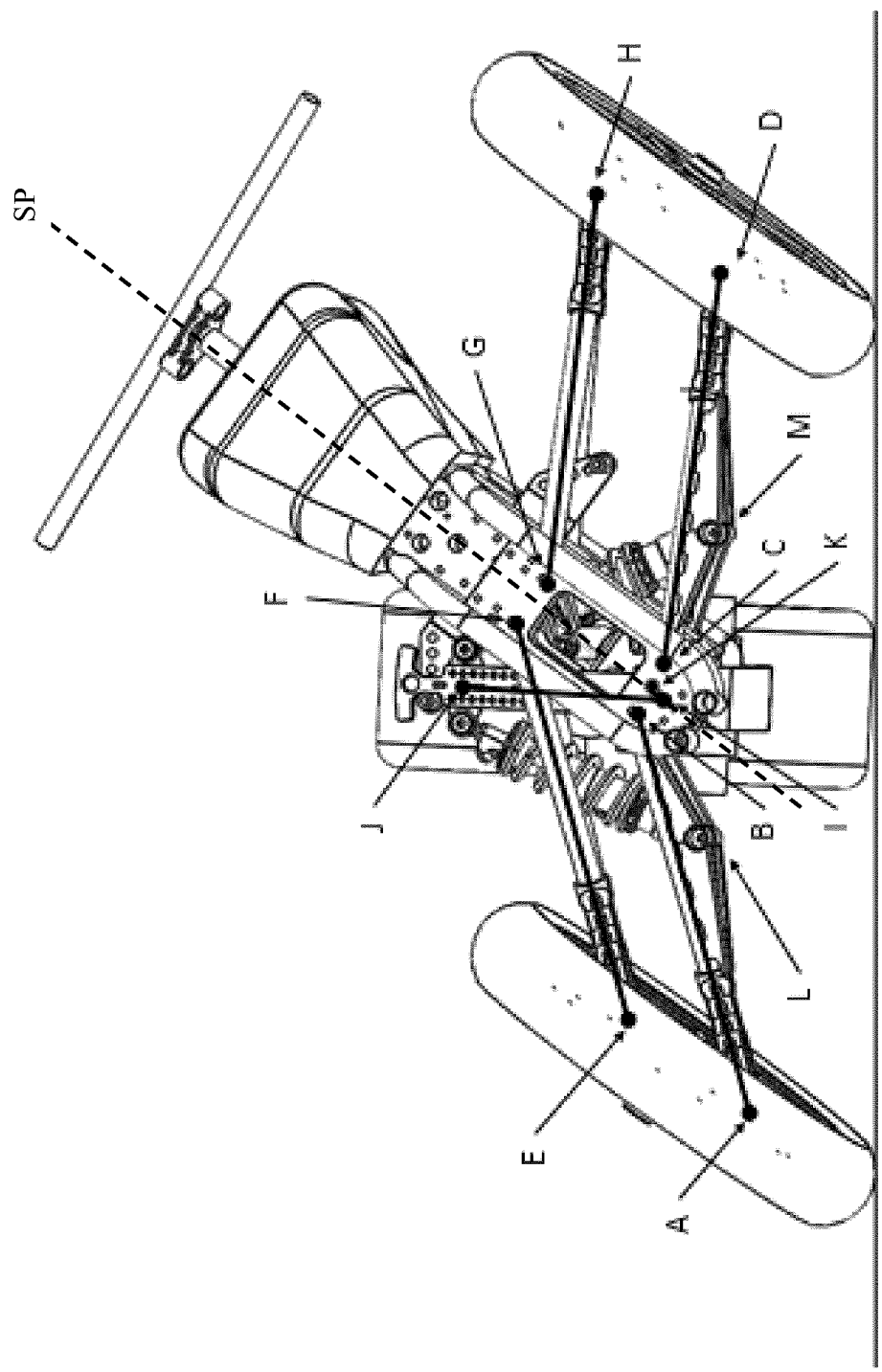
FIG. 4 is a front view as shown in FIG. 3 for describing a camber effect.

The effect of having the leaning frame pivotally connected to the undercarriage element as described above, and the details of the front suspension assembly, are further explained by reference to FIGS. 3 and 4 showing a front view of the leaning vehicle having the leaning frame tilted in a sideways direction to the left (from a driver perspective). Each of the front left suspension assembly and the front right suspension assembly comprises a wheel 13 (i.e. ground engaging member), a lower suspension arm 14, an upper suspension arm 15 and a shock absorber 20. Each of the suspension arms 14,15 comprises a first end 16,17 and a second end 18,19. In this embodiment both the lower and the upper suspension arms are so called A-arms (or control arms). The second ends 18,19 of the suspension arms are pivotally connected to the wheel via a spindle 28 (also called uprights). The first ends 16,17 of the upper and the lower suspension arms are pivotally connected to the leaning frame 1. The shock absorber 20 has an upper end 21 pivotally connected to the upper section 12 of a shock tower 9 (i.e. a suspension connecting element) and a lower end 22 pivotally connected to the lower suspension arm 14. The shock tower 9 is rigidly connected to (or form an integral part of) the undercarriage element 3. An important effect of having the undercarriage element 3 connected to the shock absorber 20 (and consequently to the front suspension assembly) via the shock tower 9 (i.e. a suspension connecting element) is that the undercarriage element is stabilized/balanced by the two front wheels 13. This prevents the undercarriage element and consequently the rear wheel 23 from tilting/keeling over.

In addition to alleviating the weight balancing problem, the present embodiment also provides a leaning vehicle wherein the rear wheel may obtain a suitable camber by tuning the relevant dimensions of the front suspension assembly. This effect is explained by reference to FIG. 4.

In FIG. 4, the upper and lower suspension arms (or A-arms) are shown arranged between points AB (i.e. from the second end 18 to the first end 16 of the lower right suspension arm 14), CD (i.e. from the second end 18 to the first end 16 of the lower left suspension arm 14), EF (i.e. from the second end 19 to the first end 17 of the upper right suspension arm 14) and GH (i.e. from the second end 19 to the first end 17 of the upper left suspension arm 14). Spindles 28 (not shown) are connected between points AE and DH. The leaning frame 1 (including straddle seat and steering handle bar) rotates around point I. The line IJ shows the distance between the rotational axis I about which the leaning frame 1 may pivot/tilt in a sideways direction, relative to the undercarriage element 3, and the height J at which the upper ends 21 of the shock absorbers 20 are connected to the shock tower 9. The shock tower 9 is a fixed part of the undercarriage element 3. The shock absorbers 20 are further connected via their lower ends 22 to the lower suspension arms at the points L and M, respectively.

Point K defines a midpoint of the distance BC between the first ends 16 of the lower suspension arms 14. That is, between the points at which the two first ends 16 are pivotally coupled to the leaning frame 1.

To obtain the desired camber at the rear wheel 23 when the rider (and consequently the leaning frame) is leaning left or right the following dimensions are the main dimensions to tune:

As explained above, the vehicle in FIGS. 3 and 4 may be considered as leaning to the left when seen from a driver's perspective. This definition is followed throughout the description.

We can then observe that the point B is lifted higher above the ground than the point C. This action will lift point L and lower point M at the lower suspension arms 14. The force caused by tilting the leaning frame 1 will be transferred through the shock absorbers 20 and the point J at the shock tower 9 will be moved to the left. Since the lower point I are at the same place, and the shock tower 9 (IJ) is a fixed part of the undercarriage element 3, the rear wheel 23 which is connected to the undercarriage element 3 will obtain a slight tilt (i.e. camber) to the left around a longitudinal axis of the undercarriage element. By this we can see that the distance BC is important for the tuning of the camber of the rear wheel 23. A larger distance BC will give a larger camber effect when the vehicle is leaning in to a turn.

The other dimension that also has a significant effect on the camber of the rear wheel is the distance IK. Since the upper point J is already defined by the distances as described above we can for this effect consider J as a fixed point. The rotational axis of the leaning frame 1 at point I is a point we can freely choose where to place at the symmetry plane SP of the leaning frame 1. The further away point I is placed underneath point K the more to the right will point I be moved when the leaning frame 1 is tilted to the left. Moving point I towards the right gives the same effect on rotating the upper part of the shock tower to the left. Since the shock tower 9 (IJ) is a fixed part of the carriage element 3 the rear wheel 23 will obtain the desired camber. When point I (i.e. the rotational axis provided by the pivot couplings 25,26 between the leaning frame 1 and the undercarriage element 3) is arranged below K, as in the embodiment of FIGS. 1-4, an increased dimension IK will increase the camber angle effect at the rear wheel.

In these types of suspensions there are commonly other factors (like scrub radius) that may reduce the camber effect of the rear wheel and the tuning above may also compensate for this.

The obtained camber will further compensate for the roll that will occur in the undercarriage element 3 in a curve when driving, because the mass of the undercarriage element 3 (Centre of Gravity above ground) will force an outward roll.

In addition to alleviating the weight balancing problem, which is most noticeable at lower speeds, the present embodiment also provides a leaning vehicle in which the resistance towards a change in tilt angle is reduced. This effect is gradually increased as the speed increases. In the leaning vehicles of the present invention, only the torsional/inertial moment of the two front wheels must be overcome when a change in tilt angle is performed. Consequently, when compared to prior art leaning vehicles, wherein the torsional/inertial moment of at least three spinning wheels must be overcome when a change in tilt angle is performed, the leaning vehicle of the present invention is more nimble and easier to turn at all speeds.

Figure 5:
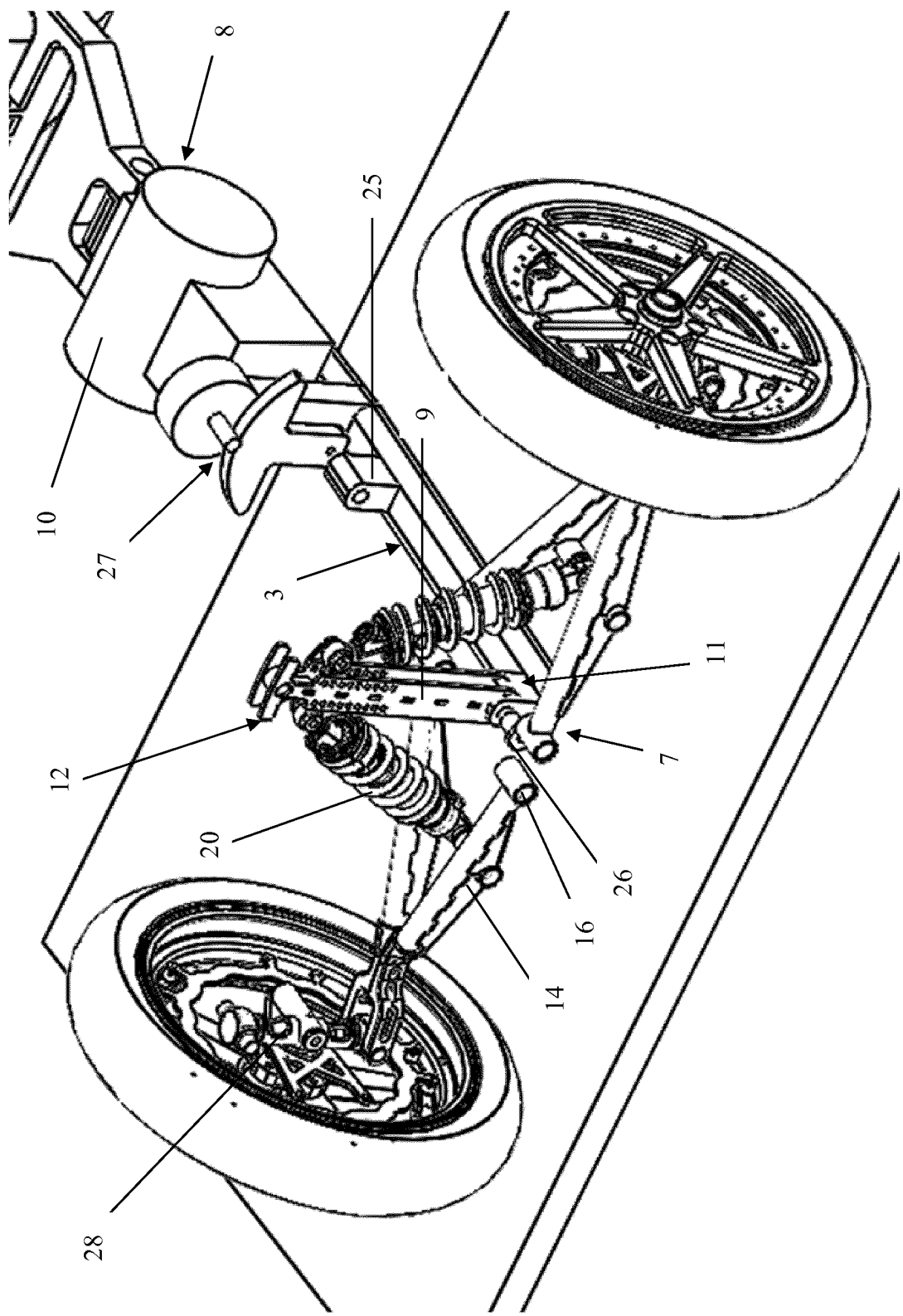
FIG. 5 is a perspective front view of the embodiment in FIGS. 1-4, wherein parts of the vehicle are removed.

FIG. 5 is a front view of the leaning vehicle in FIGS. 1-4, wherein the leaning frame 1 and the upper suspension arms 15 are removed for illustrative purposes. As shown, the undercarriage element 3 comprises a front section 7, a rear section 8 and a rigidly connected shock tower 9. The shock tower features a lower section 11 connected (or being an integral part of) the undercarriage element 3 and an upper section 12 to which an upper end of the shock absorbers 20 are connected. The two pivot couplings 25,26 (i.e. the halves of the pivot couplings fixed to the undercarriage element 3) for pivotally connecting the leaning frame 1 to the undercarriage element 3 are arranged between the motor 10 and the shock tower 9 and at the front section 7, respectively. A tilting actuator 27 is connected to the undercarriage element and is arranged to interact with the half of the pivot coupling 25 of the leaning frame 1. The tilting actuator 27 is arranged such that the leaning frame 1 will not tilt too far in a sideways direction, i.e. it provides a lean stop. Although the embodiments of the invention are shown with a tilting actuator, it is not an essential part of the invention, but may be an advantageous feature, especially when the leaning frame comprises additional weight-increasing features such as a roll-over cage and similar.

Figure 6:
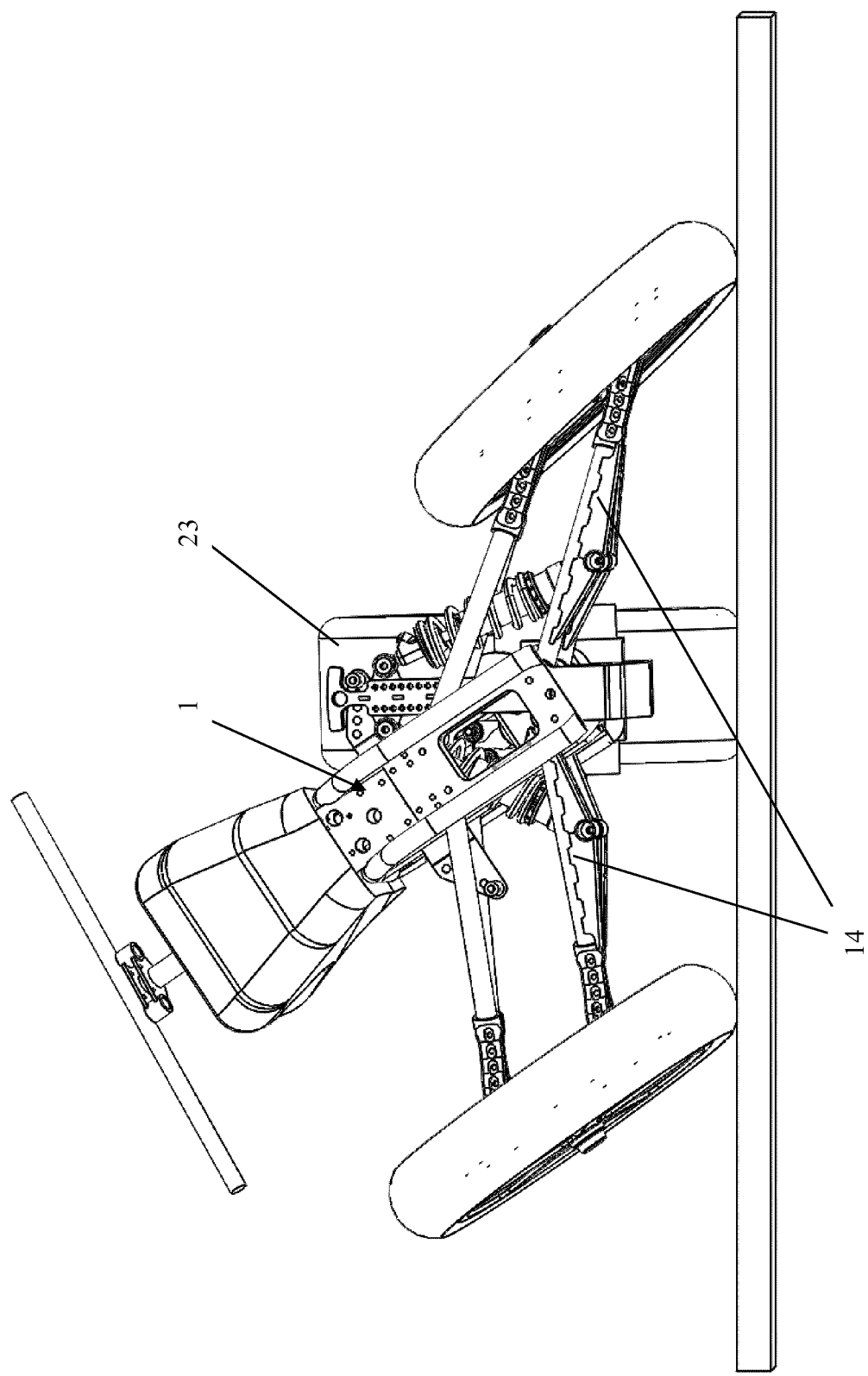
FIG. 6 is a front view of a second embodiment according to the invention, wherein the vehicle is leaning to the right from a driver perspective.
Figure 7:
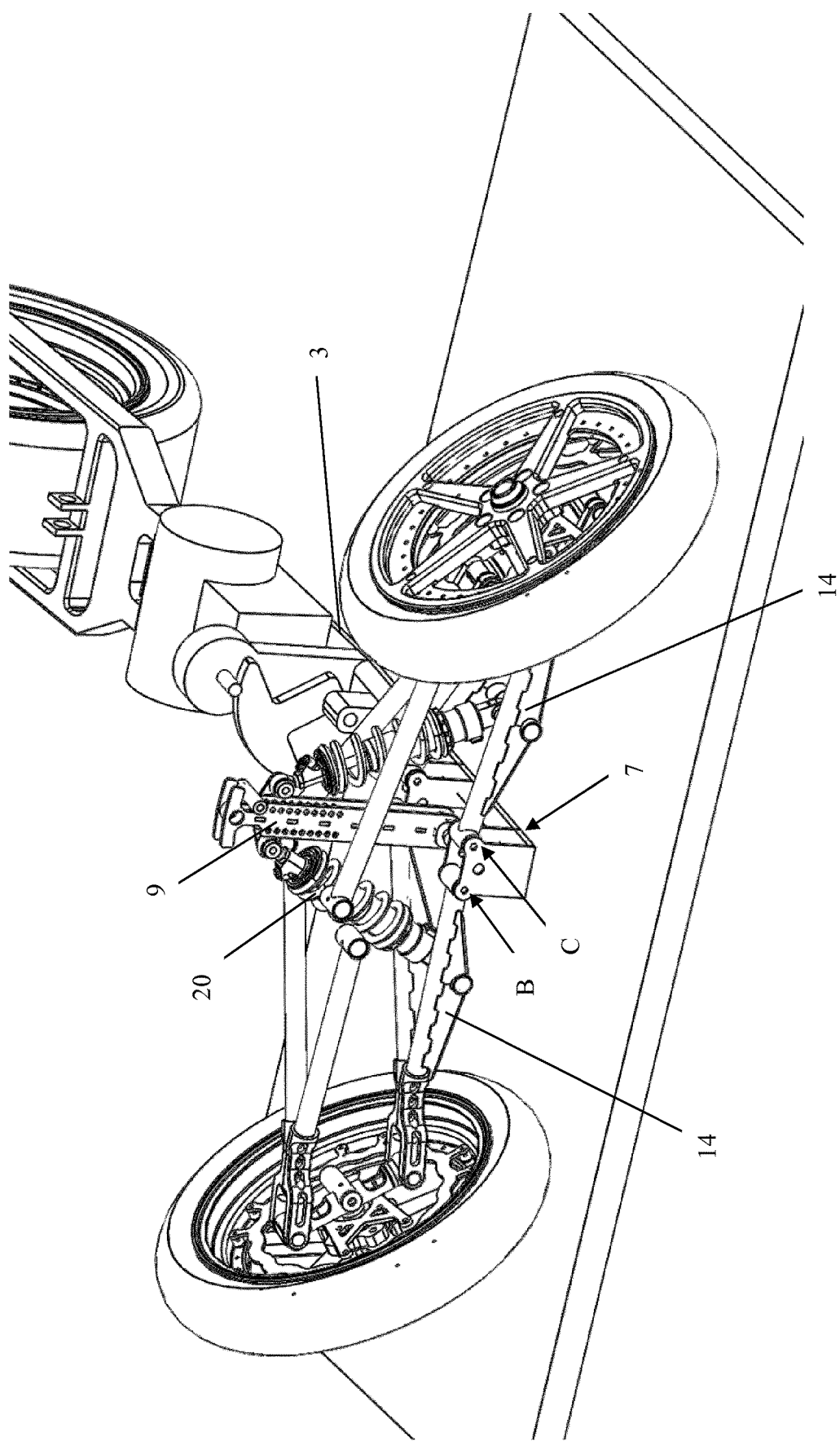
FIG. 7 is a perspective front view of the embodiment in FIG. 6, wherein parts of the vehicle are removed.

A second embodiment of a leaning vehicle is shown in FIGS. 6 and 7. The main difference between the second embodiment and the leaning vehicle of FIGS. 1-5 is that the lower suspension arms 14 are connected directly to the front section 7 of the undercarriage element 3. By connecting the lower suspension arms 14 to the undercarriage element, the rear wheel 23 will have essentially no camber effect since the position of the connecting points B and C (see explanation of FIG. 4) will not move relative to the undercarriage element 3 when the leaning frame 1 tilts in a sideways direction.

Figure 8:
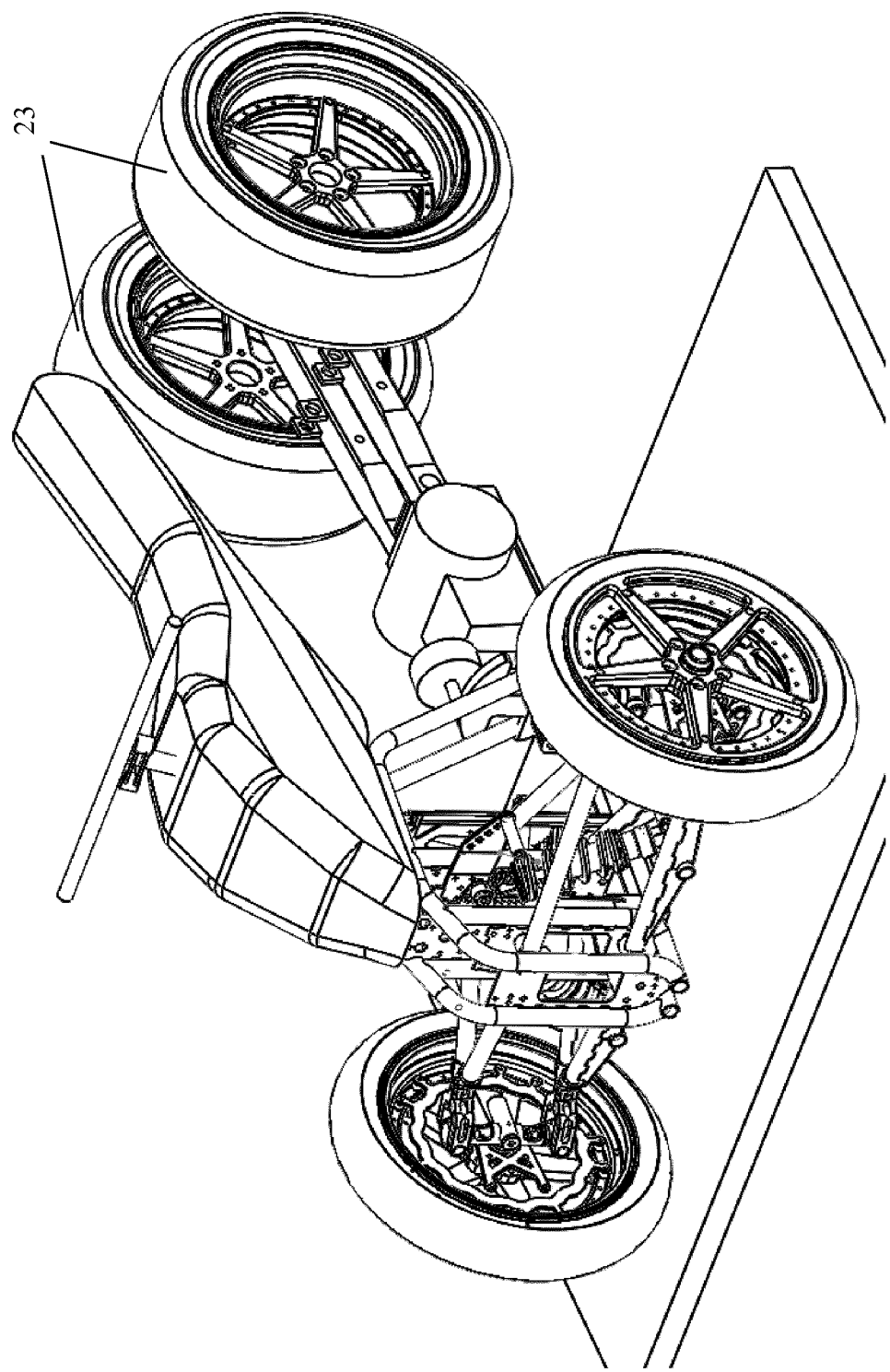
FIG. 8 is a perspective front view of a third embodiment of a leaning vehicle according to the invention.
Figure 9:
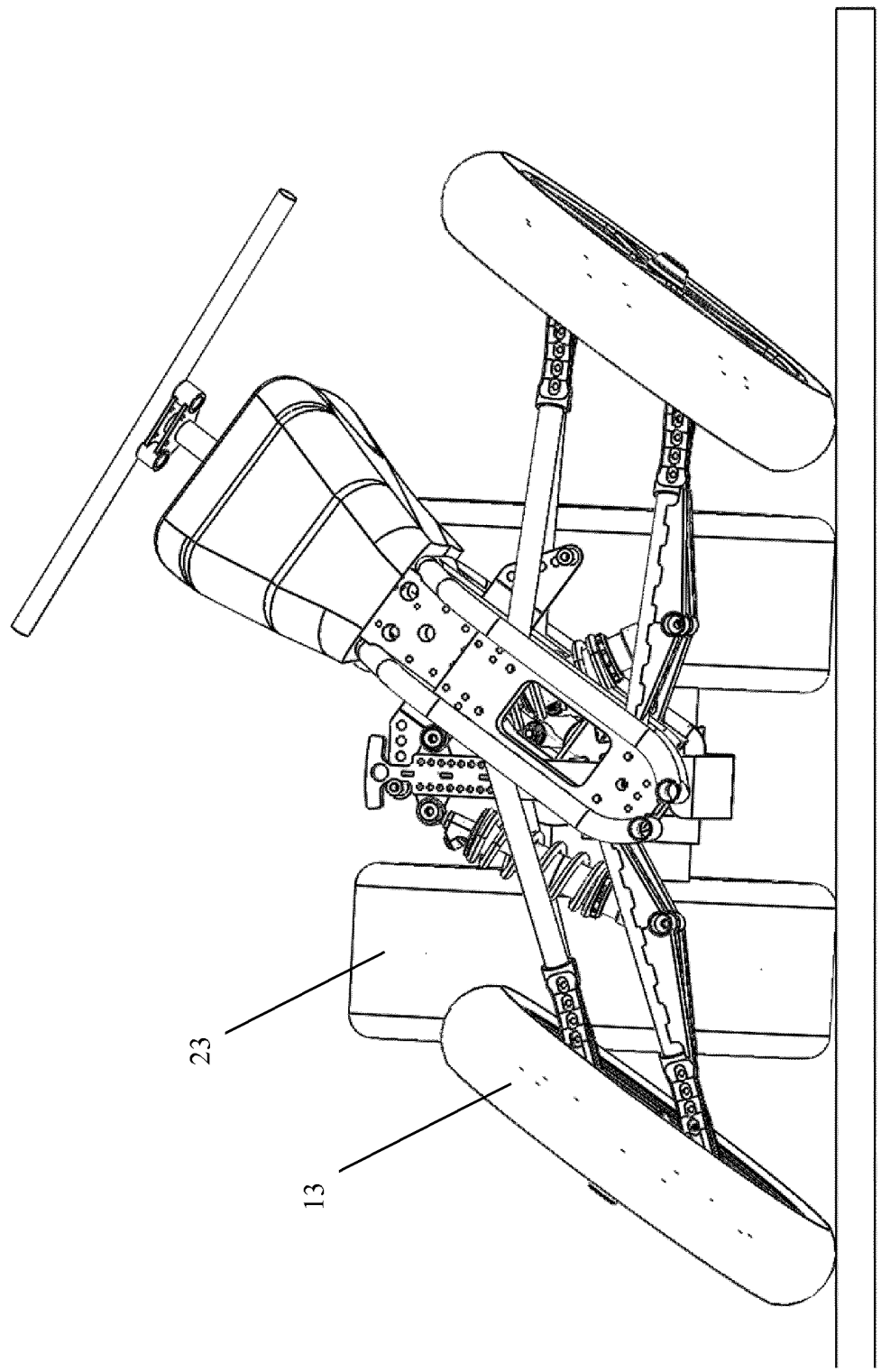
FIG. 9 is a front view of the embodiment in FIG. 8, wherein the vehicle is leaning to the left from a driver perspective.

An embodiment with two rear wheels 23 (i.e. two ground engaging members) is shown in FIGS. 8 and 9. Each rear wheel is independently connected to the rear section 8 of the undercarriage element 3. In such embodiments, it is important to note that if the two rear wheels have an independent suspension, the camber angle effect (illustrated in FIG. 9 as the slight tilt of the rear wheels) described above will be present at both rear wheels. In that case, it will be an advantage if the rear suspension springs, or shock absorbers (shown in FIGS. 10-11), have lower spring stiffness than the front springs.

In the FIGS. 1-9, the leaning vehicles are for illustrative purposes shown without certain features which would be present in a functional vehicle. These features include a steering system 29 for transferring movement of the handlebar 6 (i.e. a hand steering element) to the wheels 13 of the front suspension assembly 2, a power transfer system 30 from the motor 10 to the rear wheel and a shock absorber 31 for dampening the vertical movement of the rear wheel 23. Two embodiments of a leaning vehicle comprising these features are shown in FIGS. 10 and 11.

Figure 10:
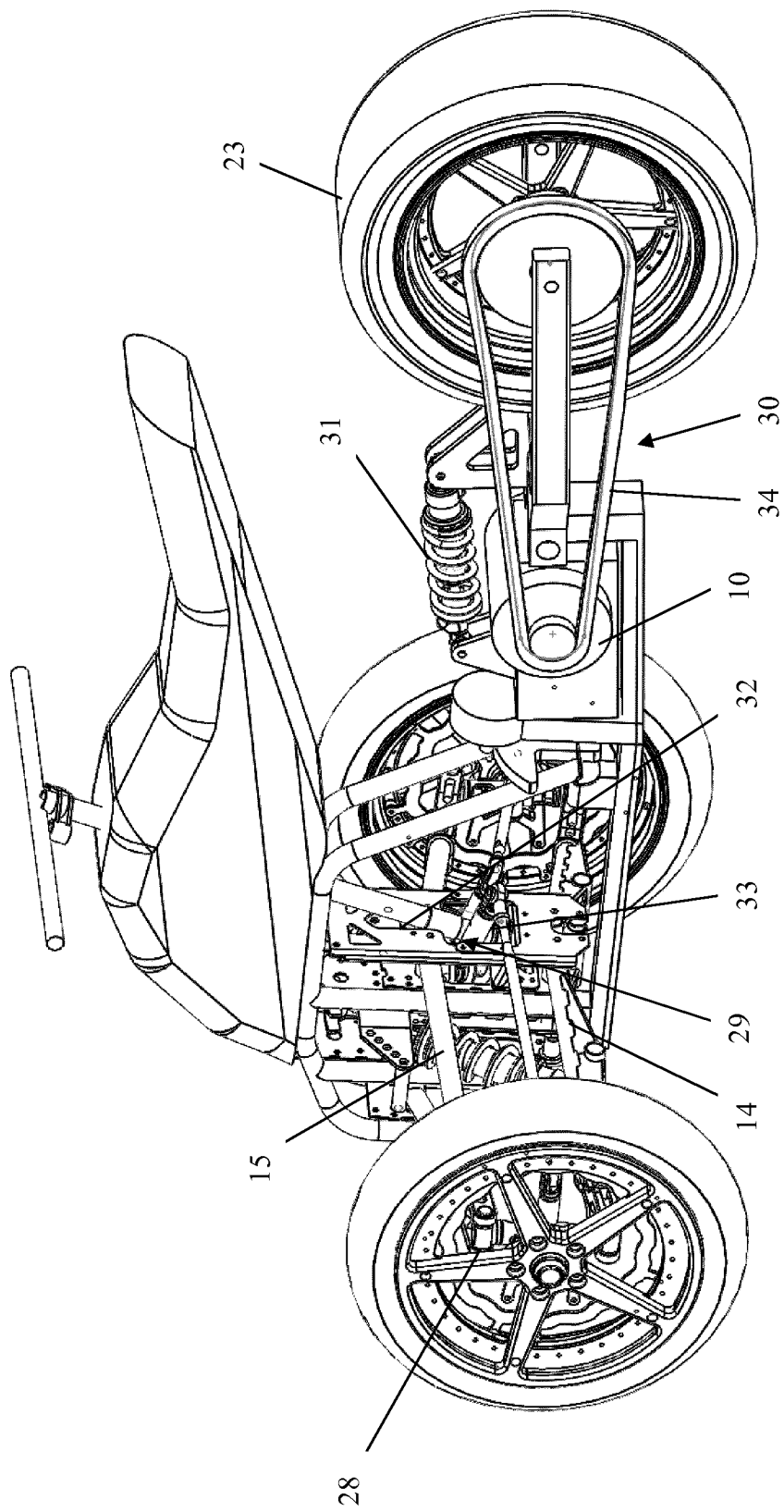
FIG. 10 is a perspective side view of the embodiment shown in FIGS. 1-5, wherein the steering mechanism, rear suspension and power transfer is shown. The steering mechanism, rear suspension and power transfer are equally applicable for the other embodiments of the invention.
Figure 11:
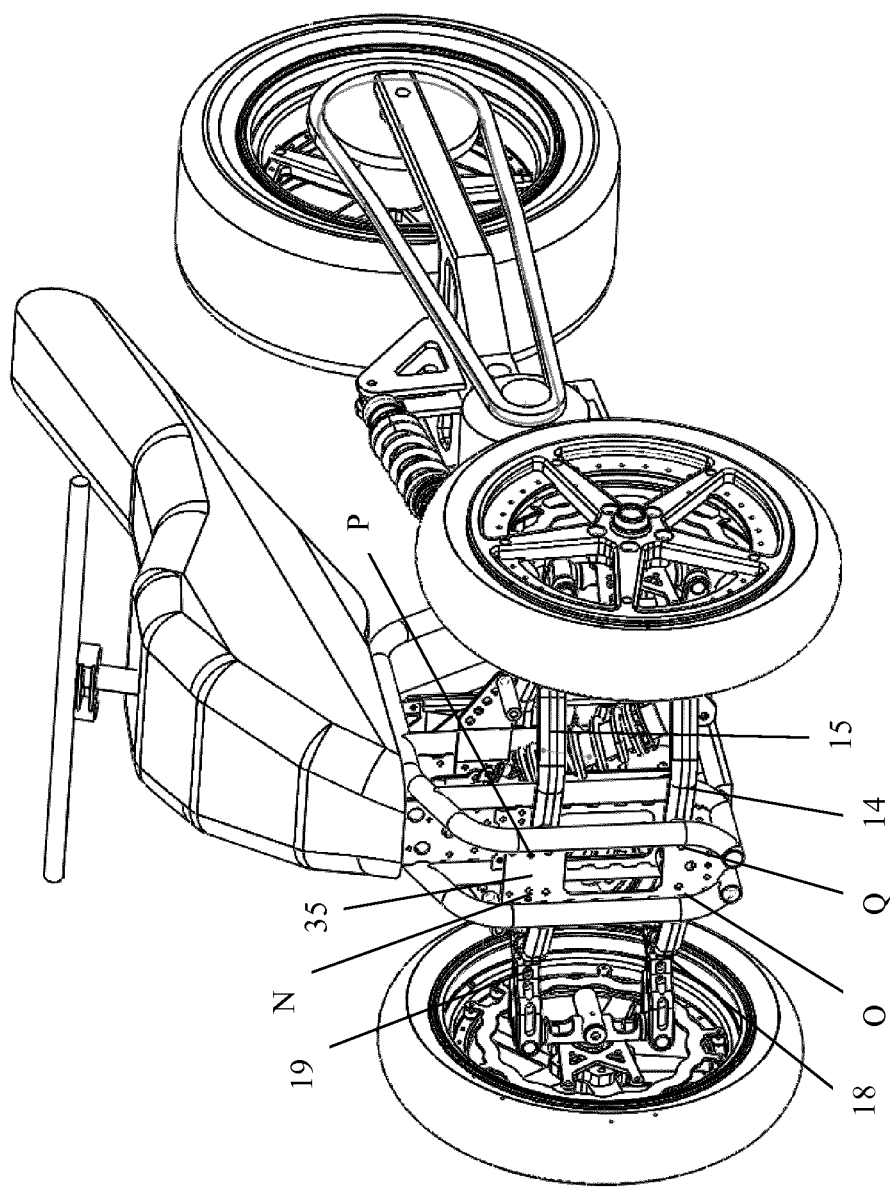
FIG. 11 is a perspective front view of an embodiment according to the invention having a narrower front suspension assembly, while retaining a high ability of suspension travel and leaning angle.

In FIGS. 10 and 11, the steering system 29 is connected with joints that have capacity of large angular movements in two directions. In this particular embodiment, the steering system is shown placed to the rear of the front suspension assembly, but may in other embodiments be connected in a number of arrangements. Typically, these steering systems will try to fulfill the Ackermann steering principle as well as possible. One end 33 of the steering tie rod joint will typically connect to the steering stem 32 and the other end will typically connect to the spindle 28 commonly named upright. The spindle/upright 28 comprises the wheel bearings and the angles are defined by the front suspension assembly and the steering system.

Further FIGS. 10 and 11 show a typical position of the engine (or motor) of either an electric motor or an internal combustion motor. In this particular embodiment, the connection of the motor to the rear wheel 23 is provided by a drive belt 34. Chains or shafts are also commonly known devices for torque transfer from the motor to the rear wheel 23. Other versions of this vehicle (not shown) may have the motor as an integrated part of the rear suspension assembly, as typically found on vehicles commonly named as scooters. Versions wherein the motor 10 is directly connected or built in to the rear wheel are also commonly known methods for power/torque transfer. FIGS. 10 and 11 also show a spring and damper unit 31 providing the desired vertical movement behavior for the rear suspension assembly.

The embodiment in FIG. 11 comprises a further advantageous, but optional, technical feature. The technical feature concerns the arrangement of the connection points of the upper and lower suspension arms of the front suspension assembly, and the solution is applicable on all embodiments of the invention, wherein the lower suspension arms are pivotally connected to the leaning frame. When designing a leaning vehicle, it is often a desire to obtain a narrow front suspension assembly. A narrow front suspension assembly is often required to obtain certain vehicle classifications. However, by simply shortening the length of the suspension arms to obtain a narrower front suspension assembly, the dampening length is also restricted due to the fact that the angular movement of the suspension arms and the length of the suspension arms define the maximum combination of dampening length and leaning angle.

In the front suspension assembly shown in FIG. 11, the length of the upper 15 and the lower 14 suspension arms are not shortened but a narrower front suspension assembly is nevertheless obtained by moving the connection points between the first ends of the suspension arms as disclosed. As shown in FIG. 11, the first ends 16,17 (hidden behind connecting plate 35) of the lower and upper suspension arms 14,15 of the front left suspension assembly (i.e. the left side of the front suspension assembly from a drivers perspective), are connected at positions N,O which are closer to the second ends 18,19 of the corresponding lower and upper suspension arms 14,15 of the front right assembly, than the positions P,Q at which the first ends of the lower and upper suspension arms of the front right suspension assembly are connected. This arrangement maintains the dampening length and leaning angle, while the width of the front suspension assembly is narrowed. Alternatively, the arrangement may be used to obtain a longer dampening length without having to widen the front suspension assembly.

Figure 12:
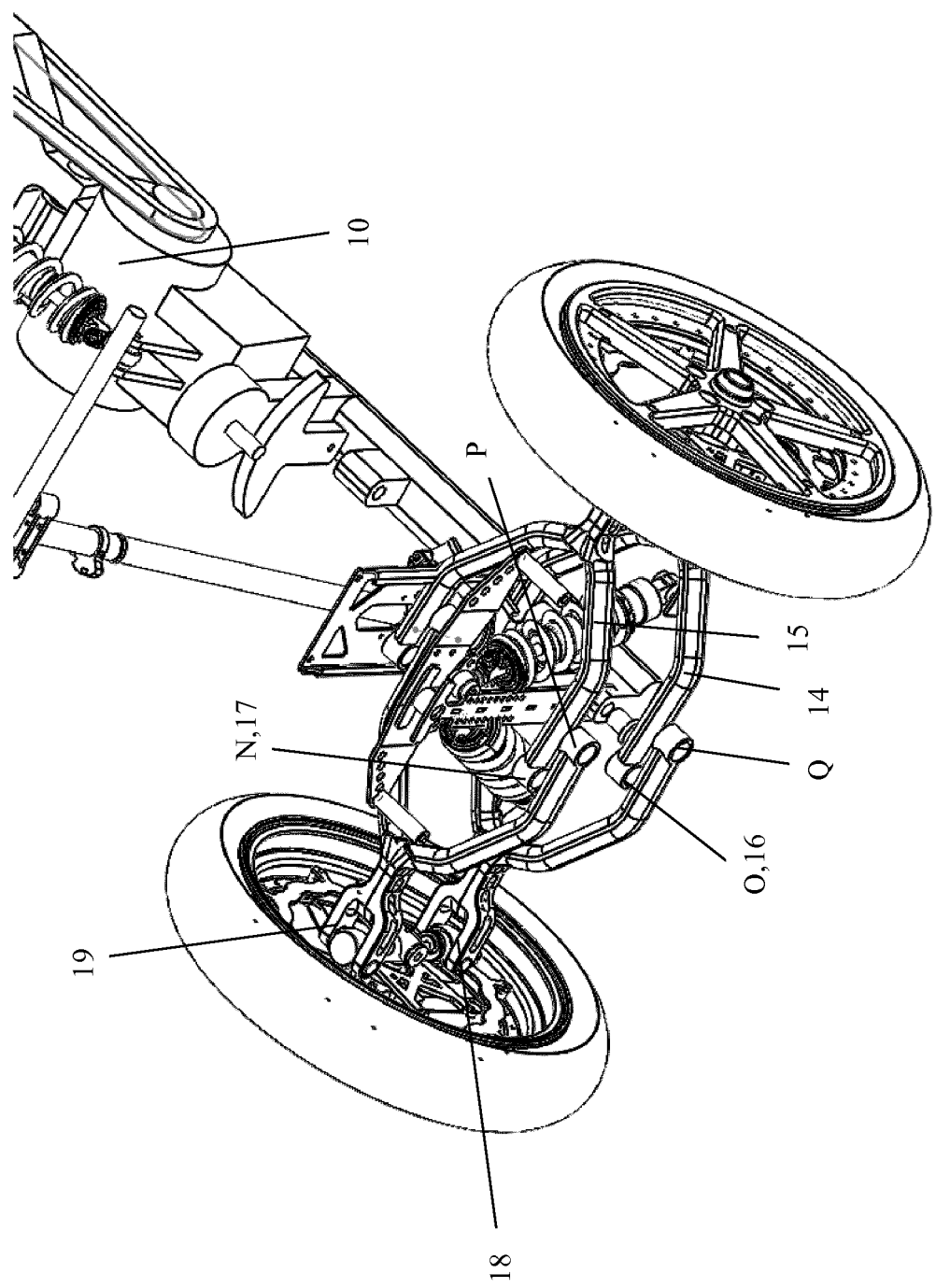
FIG. 12 is a perspective front view of the embodiment in FIG. 11, wherein parts of the vehicle are removed to show an advantageous arrangement providing the narrower front suspension assembly.
Figure 13:
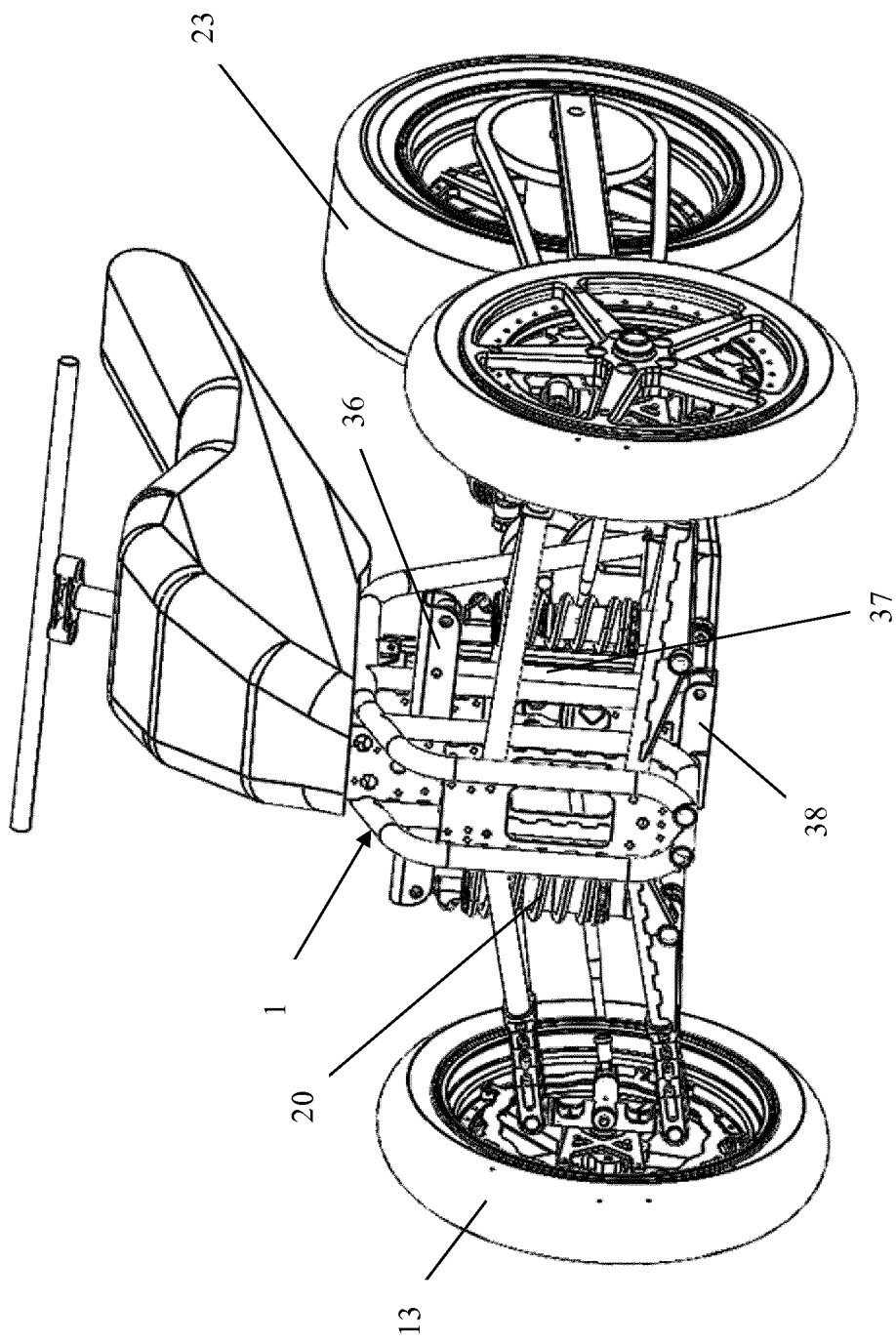
FIG. 13 is a perspective front view of a fourth embodiment of a leaning vehicle according to the invention.

The positioning of the suspension arms discussed in connection with FIG. 11 are shown in more detail in FIG. 12, wherein the leaning frame 1, the connecting plate 35 and the steering system 29 are removed for illustrative purposes.

A fourth embodiment of the invention is illustrated in FIGS. 13-16. The main differentiating feature of the fourth embodiment, compared to the embodiments described above, is the design of the suspension connecting element.

In the embodiments of FIGS. 1-12, the suspension connecting element comprises a shock tower 9 rigidly connected to the undercarriage element. The suspension connecting element of the fourth embodiment comprises a shock connecting beam 36 and an undercarriage connecting beam 37. When the leaning vehicle is in a neutral position, i.e. not tilting, the shock connecting beam 36 is horizontal and the undercarriage connecting beam is vertical. The undercarriage element 3 comprises a rigid arm 38 (or alternatively, the suspension connecting element comprises an arm 38 rigidly connected to the undercarriage element) pivotally connected to one end of the undercarriage connecting beam 37. The shock connecting beam 36 is pivotally connected to the two shock absorbers 20 at opposite ends 40,41 of said beam, and pivotally connected to the undercarriage connecting beam at an end 42 of the undercarriage connecting beam opposite the pivot connection 39 of the rigid arm. The undercarriage connecting beam and the rigid arm 38 ensure that the undercarriage element 3 is stabilized by the two front wheels 13, preventing the undercarriage element and the rear wheel from tilting/keeling over in a sideways direction.

Figure 14:
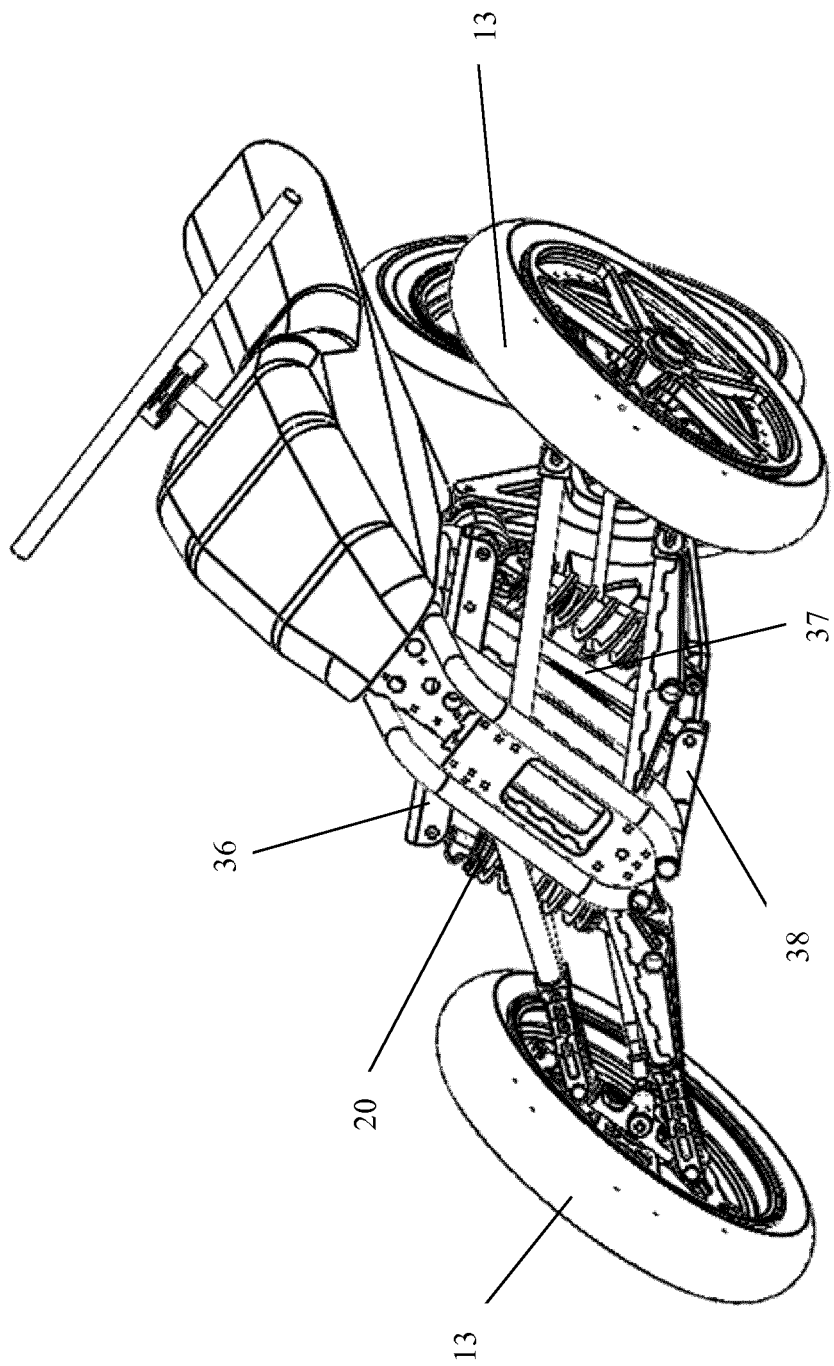
FIG. 14 is a perspective front view of the embodiment in FIG. 13, wherein the vehicle is leaning to the left from a driver perspective.
Figure 15:
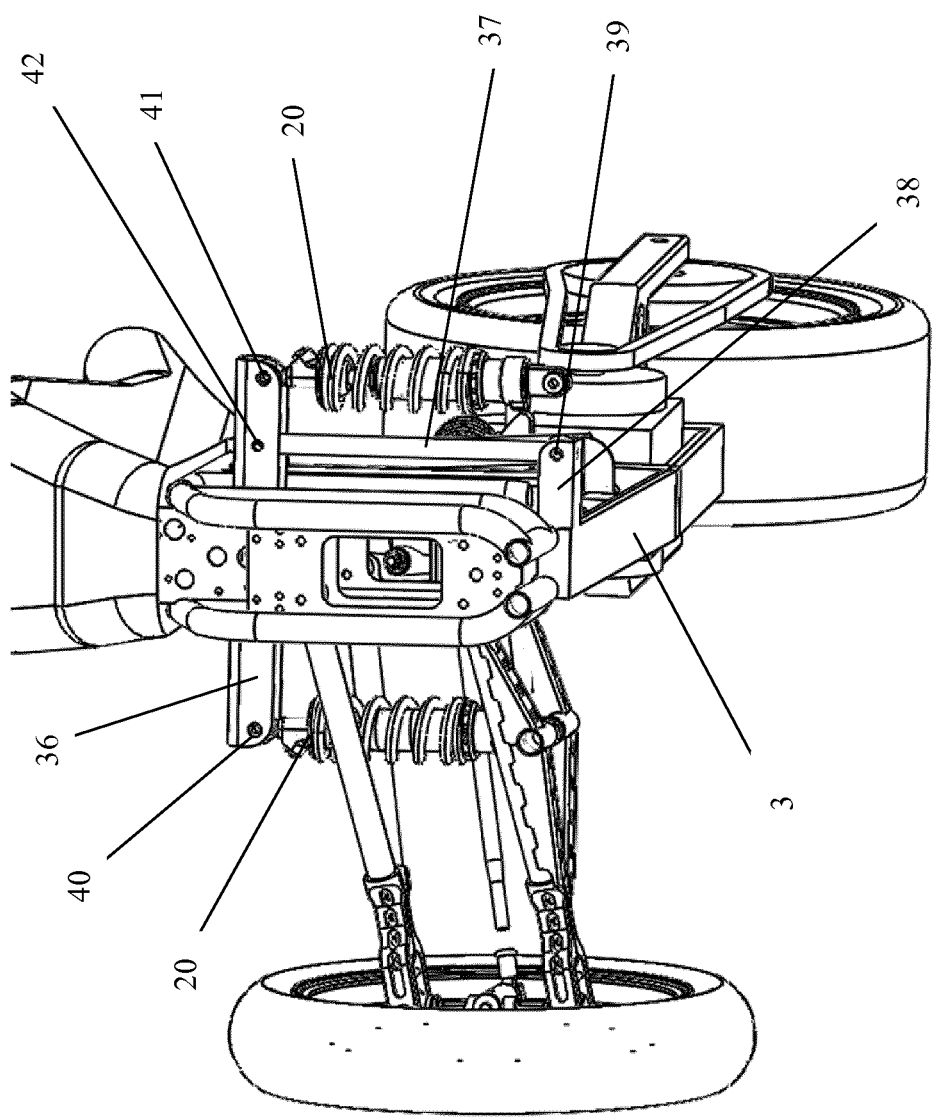
FIG. 15 is a perspective front view of the embodiment in FIG. 13, wherein parts of the vehicle are removed for illustrative purposes.
Figure 16:
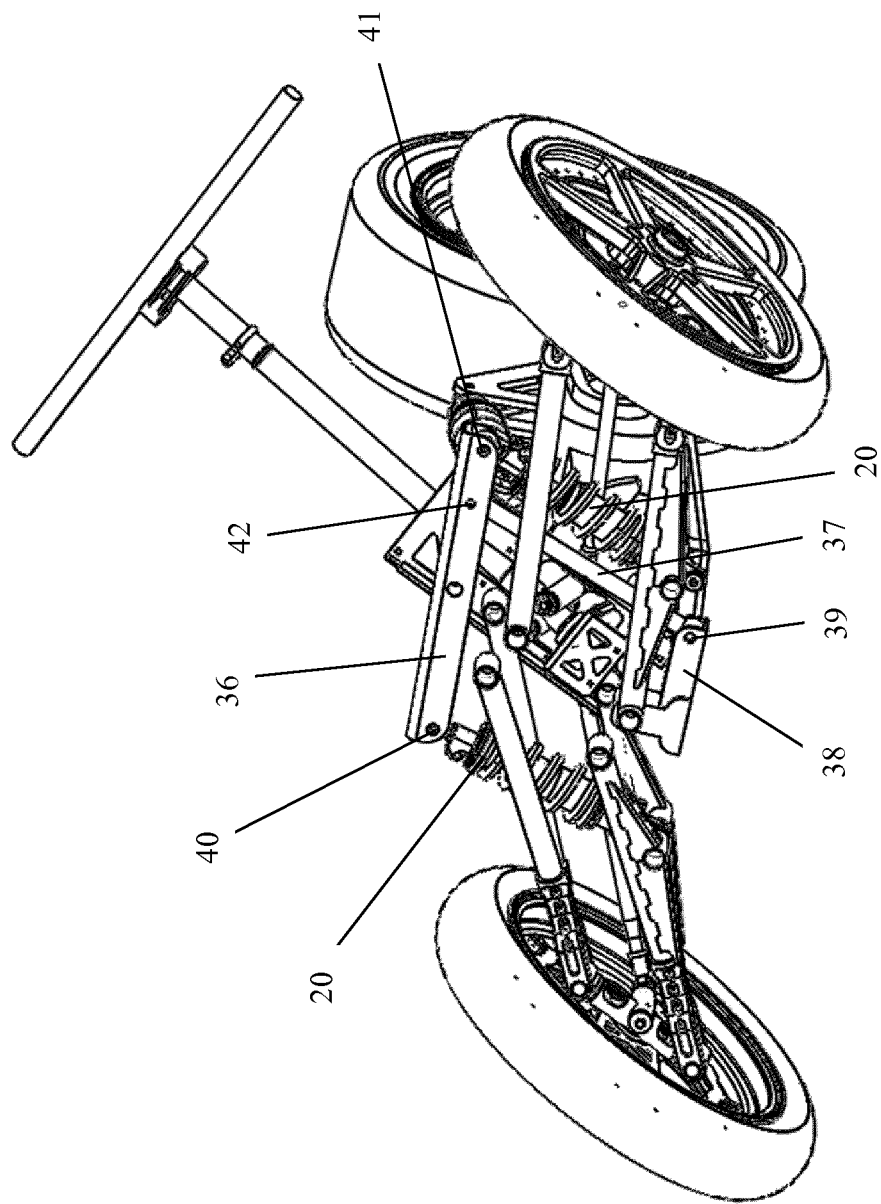
FIG. 16 is a perspective front view of the embodiment in FIG. 14, wherein parts of the vehicle are removed.
Figure 17:
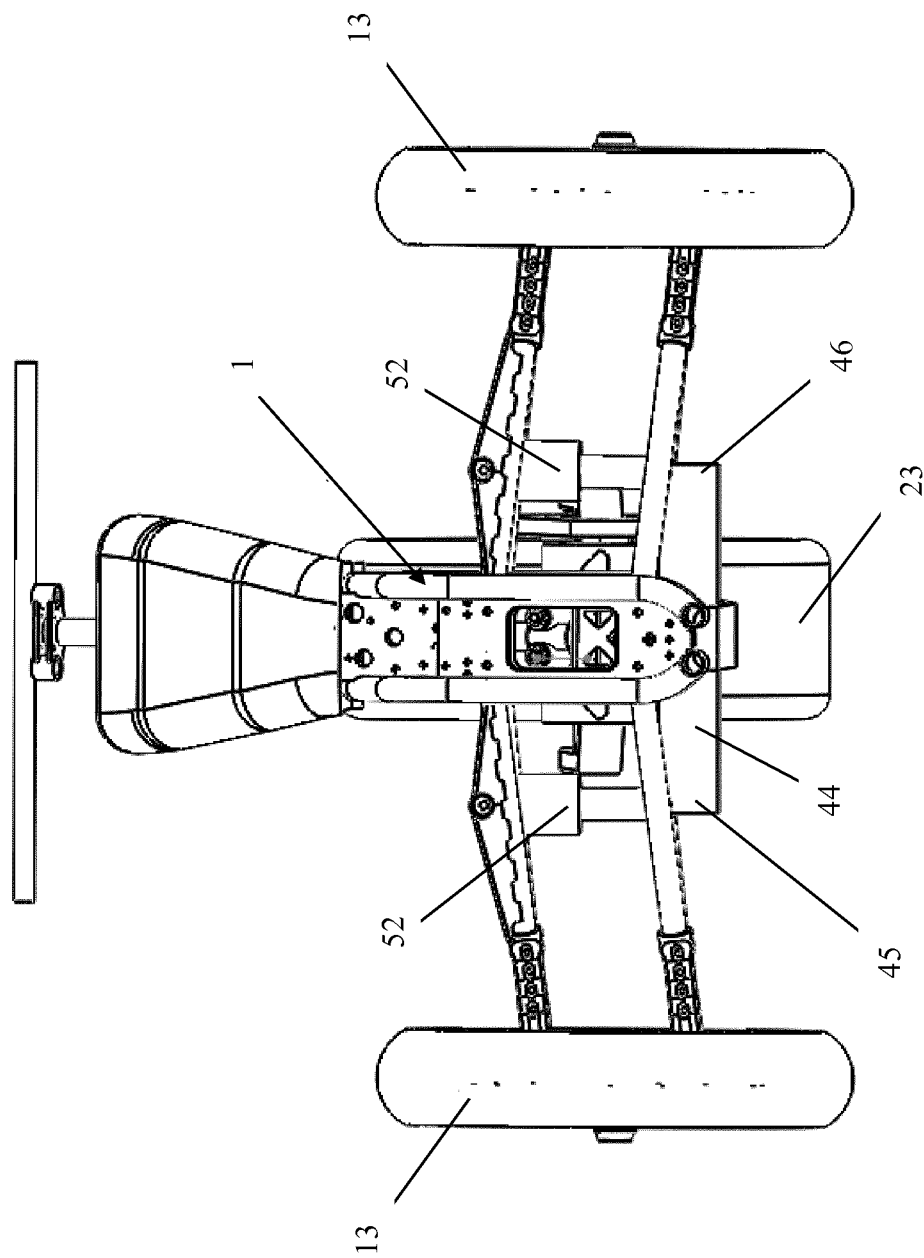
FIG. 17 is a front view of a fifth embodiment of a leaning vehicle according to the invention.
Figure 18:
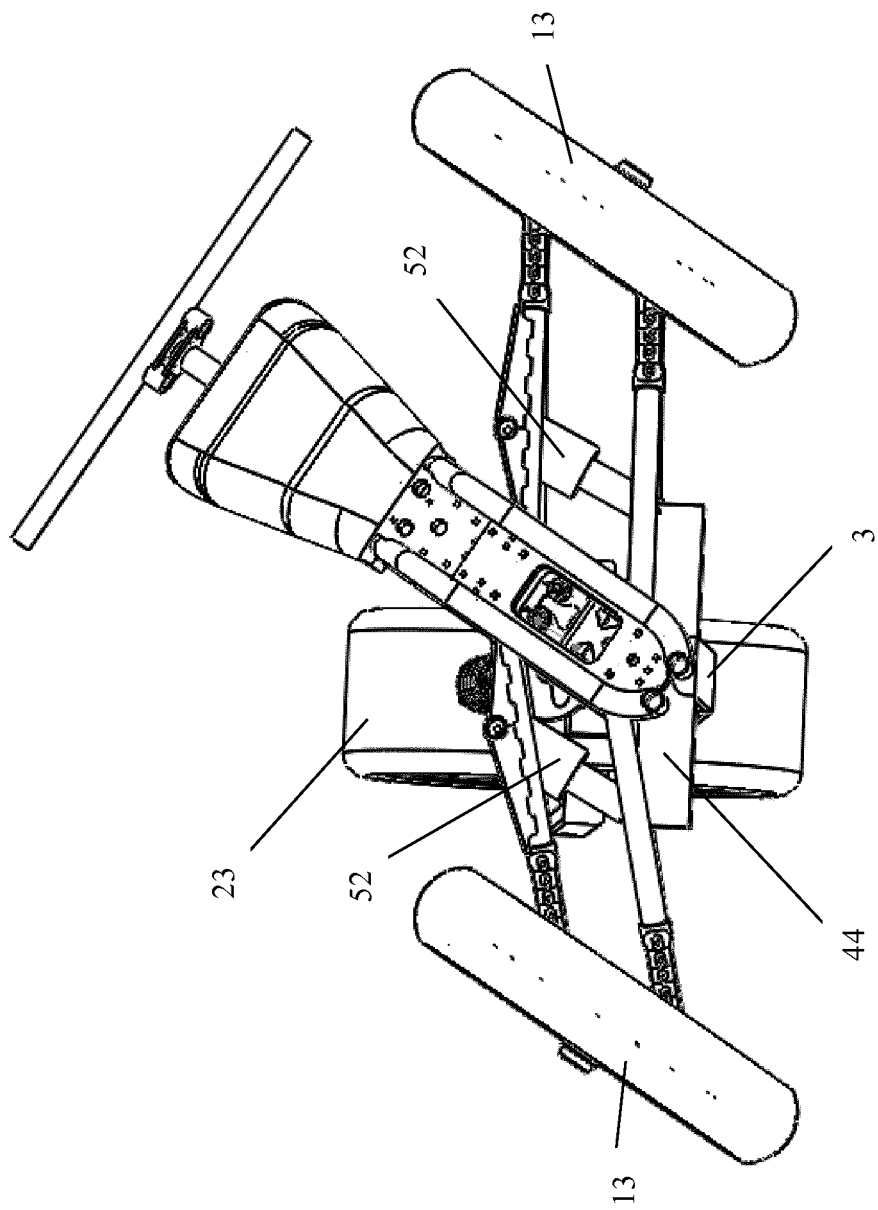
FIG. 18 is a front view of the embodiment in FIG. 17, wherein the vehicle is leaning to the left from a driver perspective.
Figure 19:
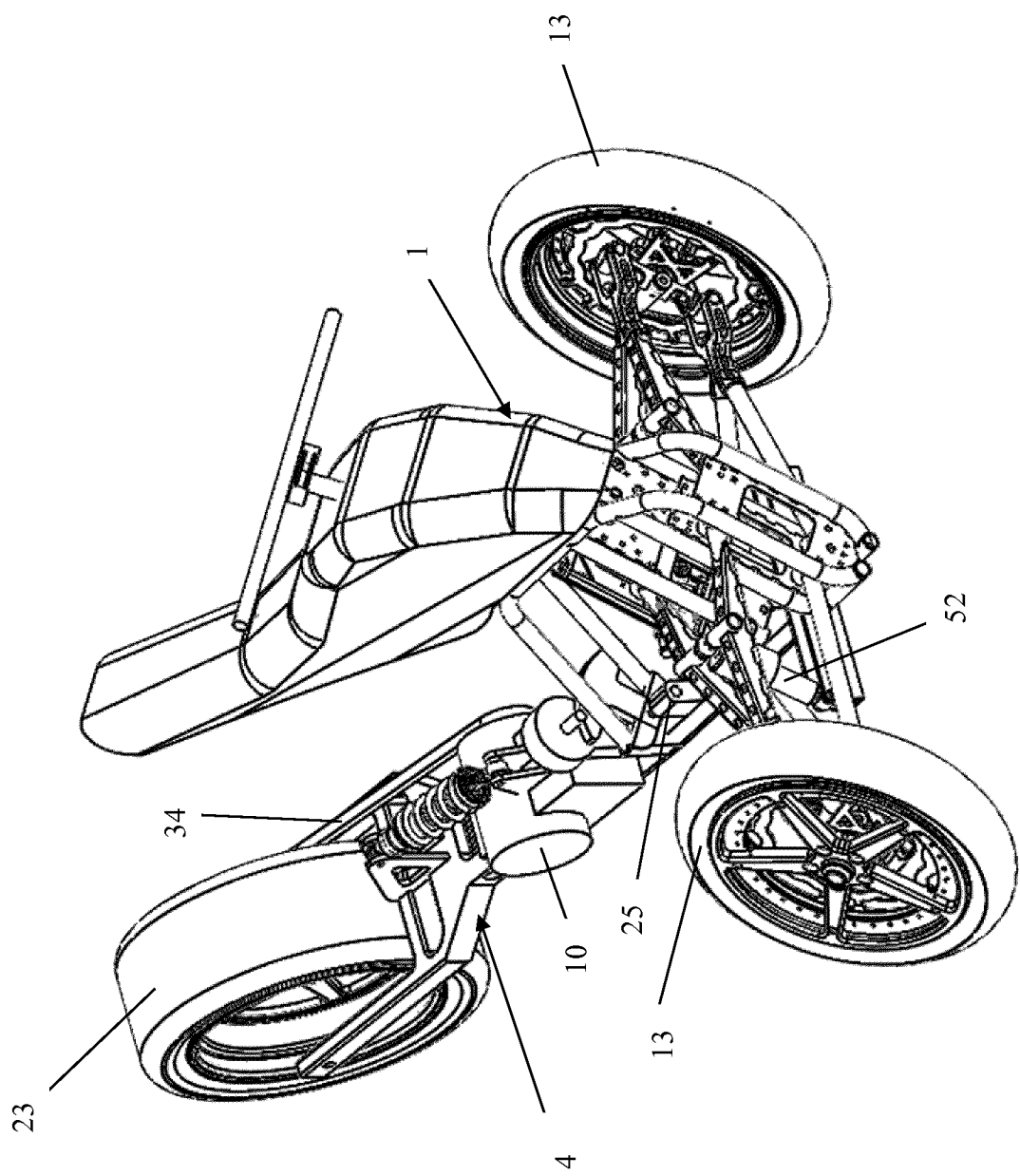
FIG. 19 is a perspective front view of the embodiment in FIG. 17.
Figure 20:
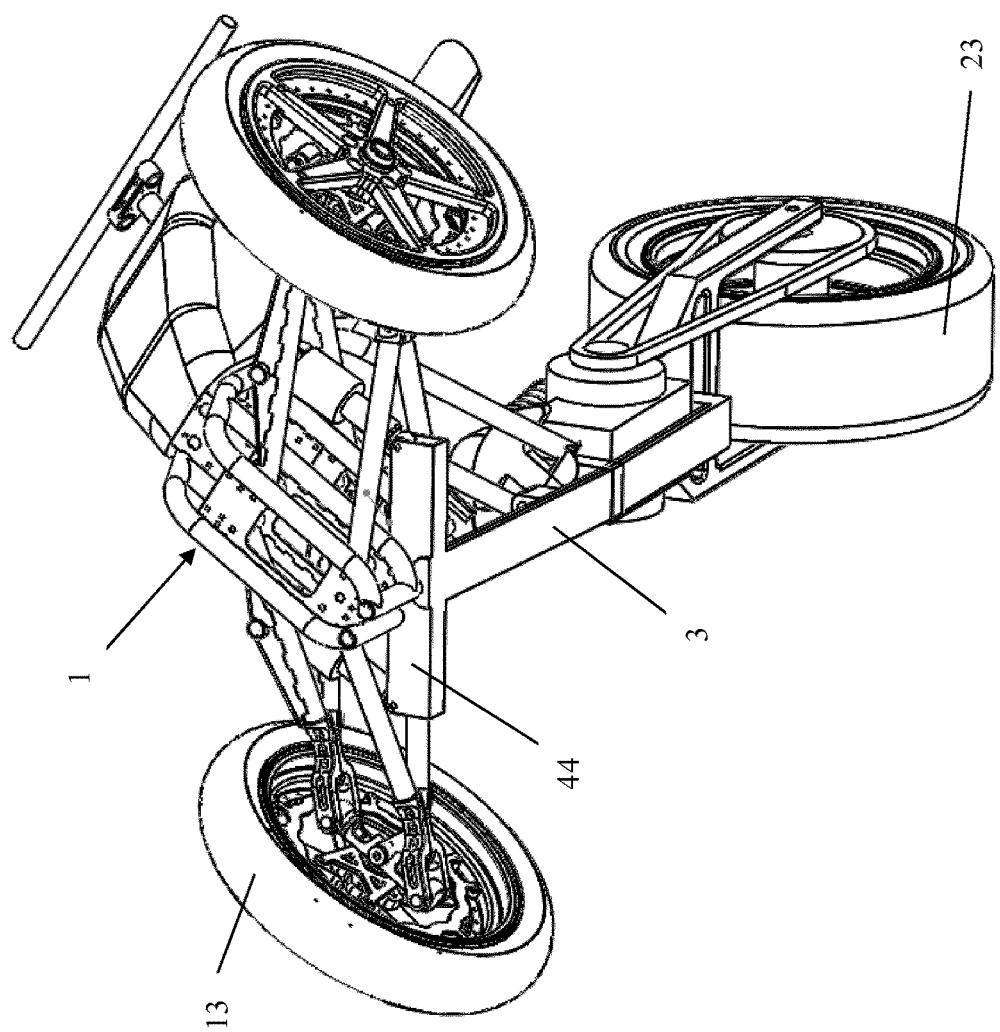
FIG. 20 is a perspective bottom view of the embodiment in FIG. 19.
Figure 21:
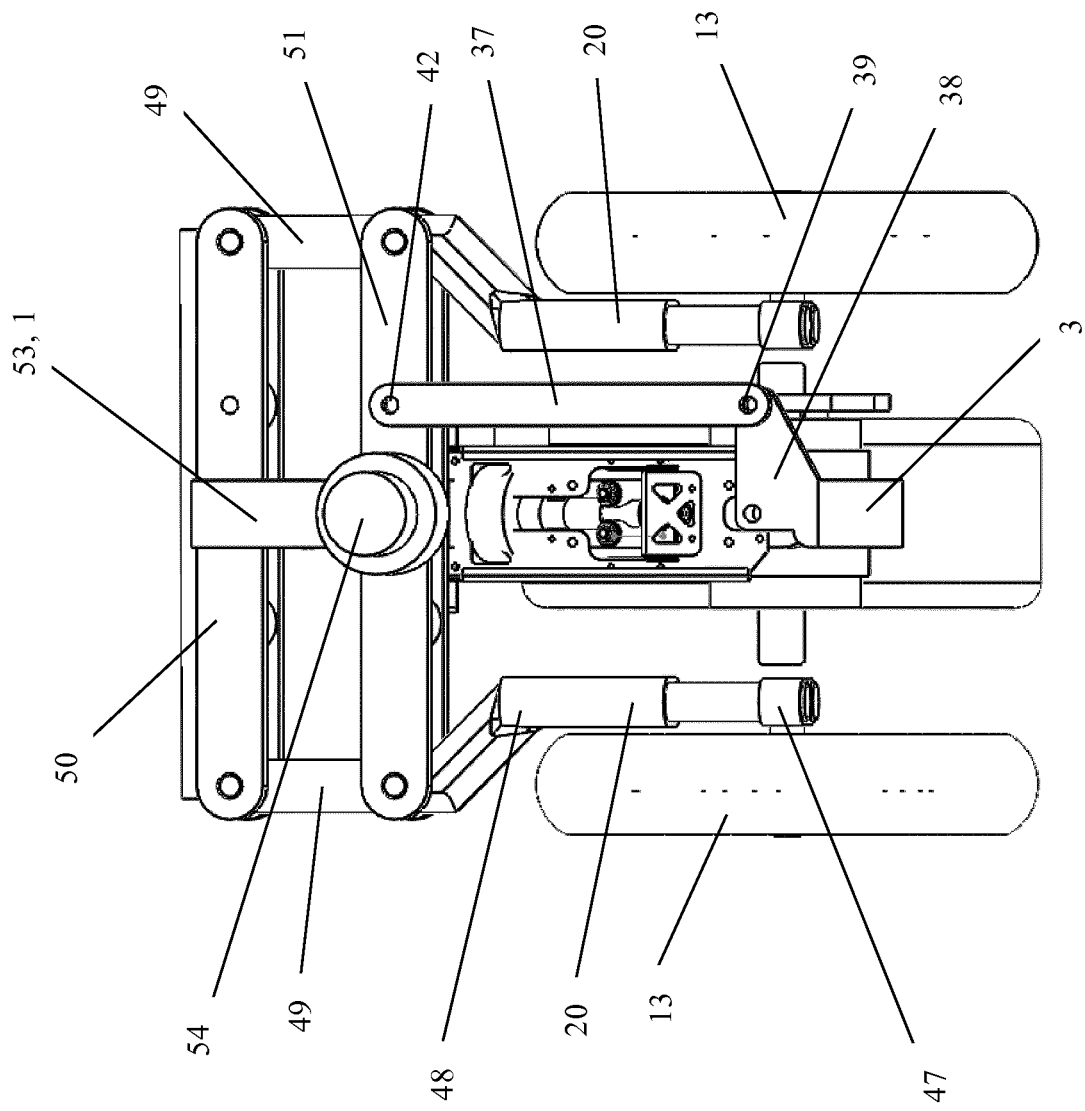
FIG. 21 is a front view of a sixth embodiment of a leaning vehicle according to the invention.
Figure 22:
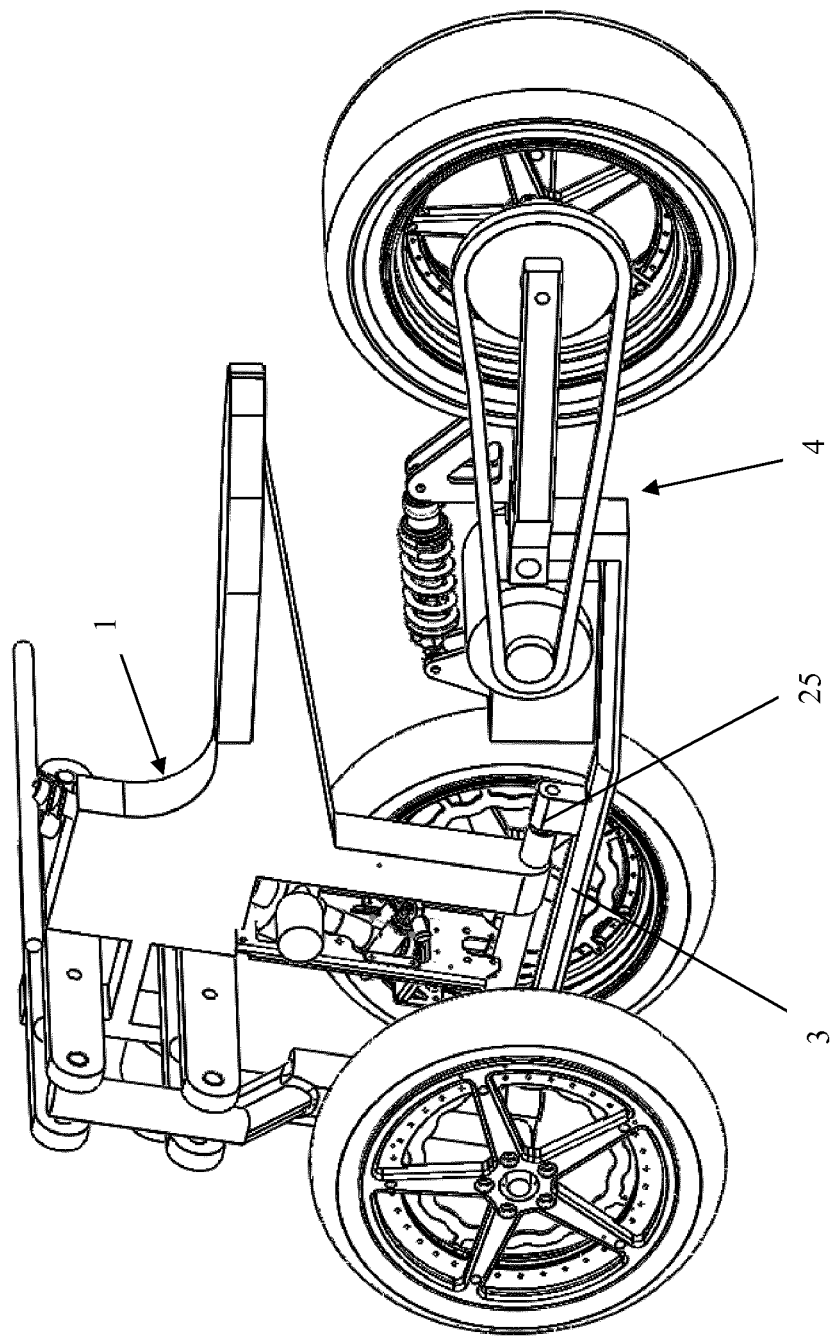
FIG. 22 is a perspective side view of the embodiment in FIG. 21.
Figure 23:
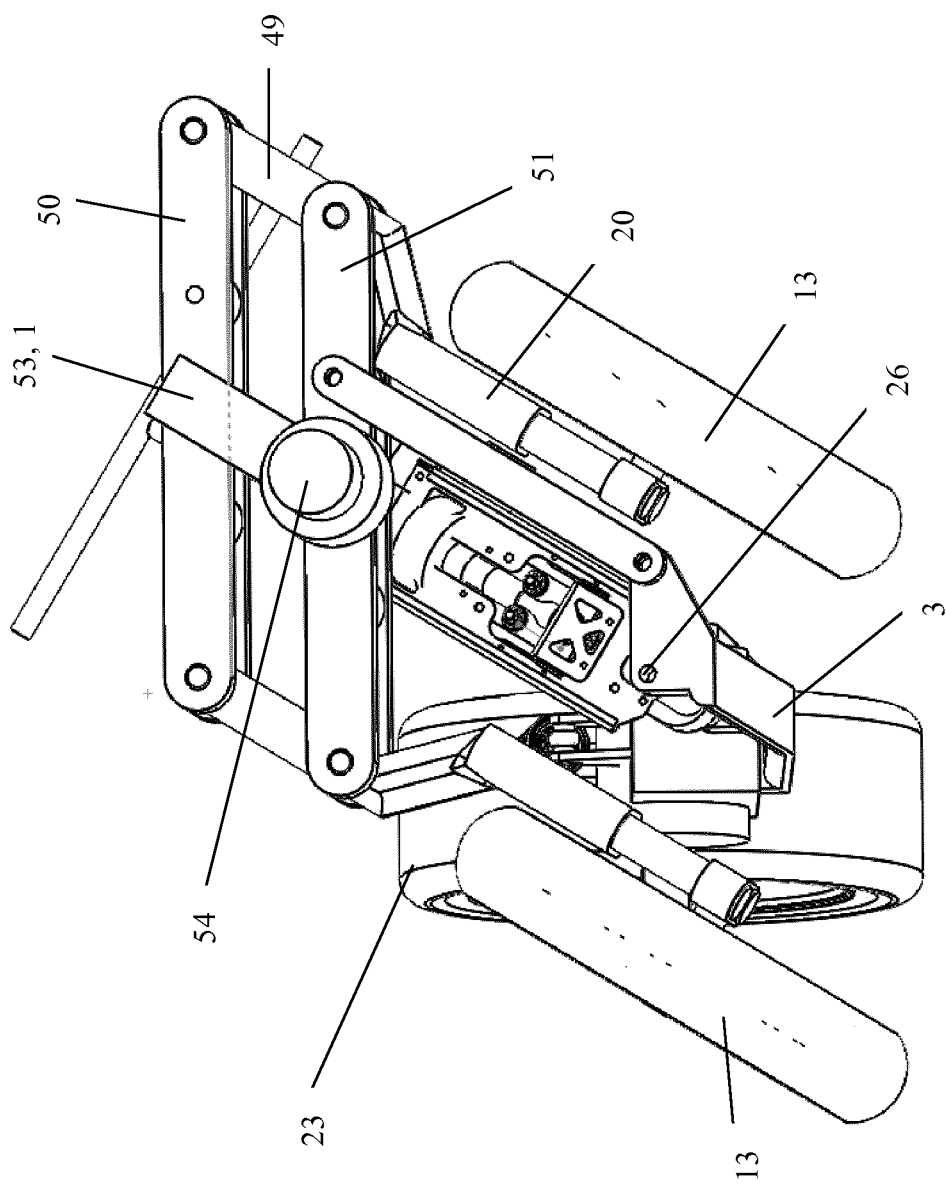
FIG. 23 is a front view of the embodiment in FIG. 21, wherein the vehicle is leaning to the left from a driver perspective.
Figure 24:
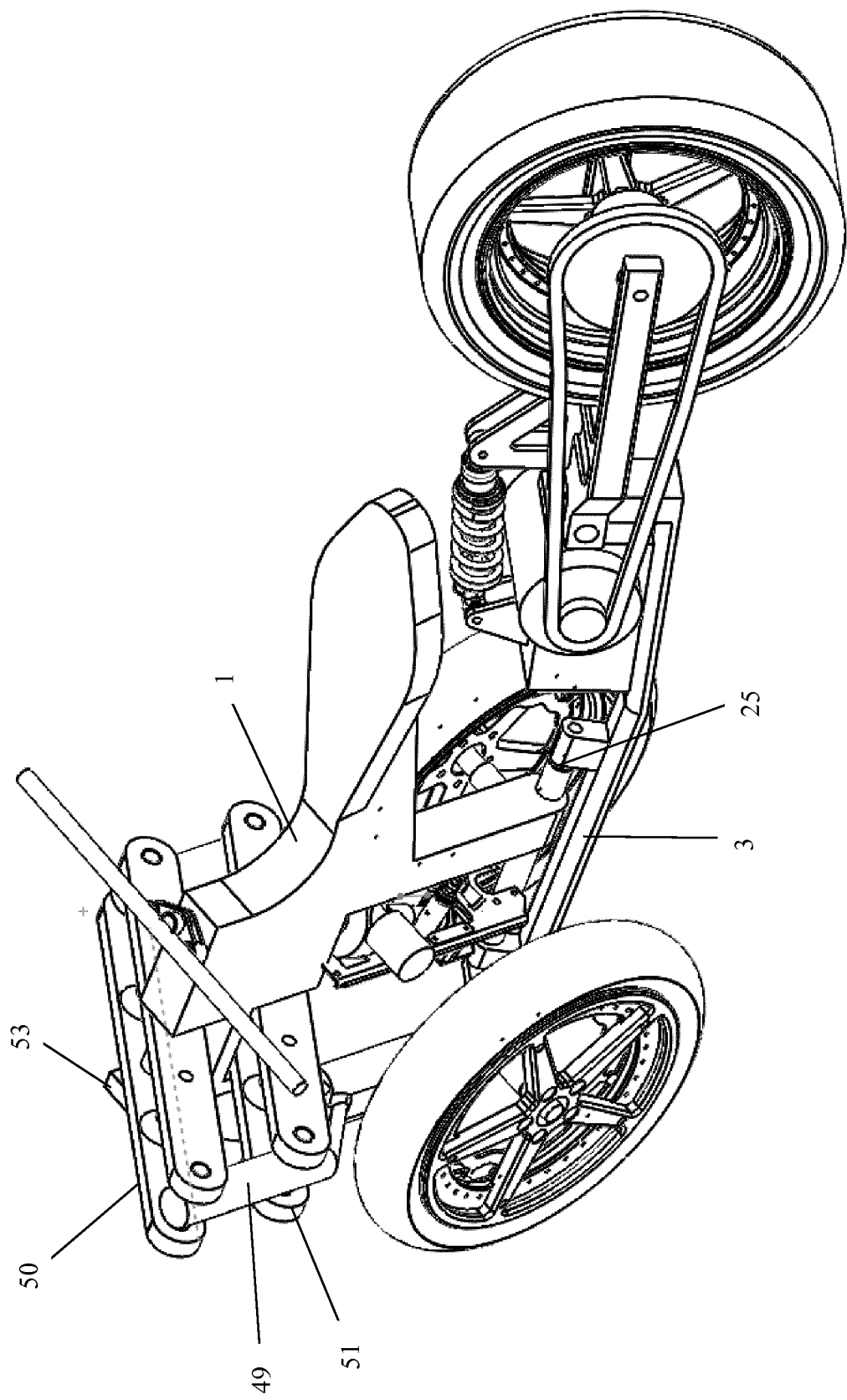
FIG. 24 is a perspective side view of the embodiment in FIG. 23.

When the leaning vehicle is tilted, see FIGS. 14 and 16, the shock connecting beam 36 is moved in the same sideways direction as the leaning frame, while kept in a substantially horizontal position. As is apparent from the figures, the shock connecting beam is slightly tilted downwards in the tilt direction.

The function of the suspension connecting element comprising a shock connecting beam 36 and an undercarriage connecting beam 37 is the same as the one obtained by use of a shock tower 9 as described above for the first embodiment. Further, by connecting the front suspension assembly (i.e. the shock absorbers of the front suspension assembly) to the undercarriage element via the suspension connecting element (i.e. the shock connecting beam 36 and the undercarriage connecting beam 37), the undercarriage element is stabilized/balanced by the two front wheels 13.

Apart from the design of the suspension connecting element, the features and function of the leaning vehicle of the fourth embodiment are the same as described for the embodiments disclosed above. In particular, the undercarriage element 3 is pivotally connected to the leaning frame, and connected to the rear suspension assembly 4 comprising a rear wheel, such that the leaning frame, and consequently the two front wheels 13, may move in a sideways direction independent of the undercarriage element and the rear wheel, i.e. the two front wheels and the leaning frame may tilt in a sideways direction without tilting the rear wheel (except the slight camber obtained due to the connection to the undercarriage element).

A fifth embodiment of the invention is illustrated in FIGS. 17-20. In the fifth embodiment, the front suspension assembly comprises two pull shock absorbers 52, each having an upper end connected to a respective upper suspension arm. The lower end of each shock absorber is connected to the undercarriage element 3 via opposite ends 45,46 of the shock connecting beam 44 (i.e. a suspension connecting element). The shock connecting beam 44 is an integral part of, or rigidly connected to, the undercarriage element 3.

Apart from the design of the suspension connecting element, the features and function of the leaning vehicle of the fifth embodiment are the same as described for the embodiments disclosed above. In particular, the undercarriage element 3 and the front suspension assembly is pivotally connected to the leaning frame 1, and the undercarriage element connected to the rear suspension assembly 4 comprising a rear wheel 23, such that the leaning frame, and consequently the two front wheels 13 of the front suspension assembly, may move in a sideways direction independent of the undercarriage element and the rear wheel, i.e. the two front wheels and the leaning frame may tilt in a sideways direction without tilting the rear wheel.

Further, due to the connection between the undercarriage element and the shock absorbers of the front suspension assembly, via the shock connecting beam, the undercarriage element is stabilized by the two front wheels and prevented from tilting.

A sixth embodiment of the invention is illustrated in FIGS. 21-24. Contrary to the previously described embodiments, the illustrated vehicle is not based on a front suspension assembly comprising lower and upper A-arms. In this embodiment, the suspension assembly is made up of two front wheels 13, each wheel connected to a shock absorber 20 via a hub element 47. An upper end 48 of each shock absorber is further connected to a suspension connecting element comprising two vertical (i.e. vertical when the vehicle is in a non-tilting position) shock connecting beams 49 pivotably interconnected by an upper suspension connecting beam 50 and a lower suspension connecting beam 51. An upper section of the shock connecting beams and the suspension connecting beams form a parallelogram. The function and design of a similar front suspension assembly is disclosed in European patent application EP 3002200 A1, the content of said application relating to the front suspension assembly is incorporated herein by reference. To stabilize the undercarriage element, the suspension connecting element comprises an undercarriage connecting beam 37 and the undercarriage element 3 comprises a rigid arm 38 (or alternatively, the suspension connecting element comprises an arm 38 rigidly connected to the undercarriage element) pivotally connected to one end of the undercarriage connecting beam 37. The lower suspension connecting beam is pivotally connected to the undercarriage connecting beam at an end 42 of the undercarriage connecting beam opposite the pivot connection 39 of the rigid arm 38. The undercarriage connecting beam and the rigid arm 38 ensure that the undercarriage element 3 is stabilized by the two front wheels 13, preventing the undercarriage element and the rear wheel from tilting/keeling over in a sideways direction. A front section 53 of the leaning frame 1 is pivotally connected to the front suspension assembly via the lower suspension connecting beam. In this embodiment, the front section 53 is pivotally connected via an electronic tilt actuator 54 able to control the pivot angle between the lower suspension beam and the leaning frame.

Apart from the design of the suspension connecting element, the features and function of the leaning vehicle of the sixth embodiment are the same as described for the embodiments disclosed above. In particular, the undercarriage element 3 and the front suspension assembly is pivotally connected to the leaning frame 1, and the undercarriage element connected to the rear suspension assembly 4 comprising a rear wheel 23, such that the leaning frame, and consequently the two front wheels 13 of the front suspension assembly, may move in a sideways direction independent of the undercarriage element and the rear wheel, i.e. the two front wheels and the leaning frame may tilt in a sideways direction without tilting the rear wheel. Further, due to the connection between the undercarriage element and the shock absorbers of the front suspension assembly, via the suspension connecting element, the undercarriage element is stabilized by the two front wheels and prevented from tilting.

All of the above described embodiments of a leaning vehicle according to the invention may advantageously be equipped with footboards, as disclosed in WO 2005/002957 A1. Preferably, the footboards are rigidly connected to the undercarriage element. The same reference numbers are used in all disclosed embodiments when referring to identical or substantially equal features.

The invention claimed is:

1. A leaning vehicle comprising a leaning frame, a front suspension assembly, an undercarriage element, a rear suspension assembly and a motor, wherein
    the leaning frame comprises a straddle seat and a hand steering element, the hand steering element operatively connected to the front suspension assembly;
    the undercarriage element comprises a front section and a rear section, and is connected to a suspension connecting element;
    the front suspension assembly comprises two ground engaging members and at least one shock absorber, and is connected to the leaning frame and the suspension connecting element, such that the two ground engaging members of the front suspension assembly will tilt in a same direction as the leaning frame,
        wherein the front suspension assembly comprises a front left suspension assembly and a front right suspension assembly, and
        each of the front left suspension assembly and the front right suspension assembly comprises:
        one of the ground engaging members;
        one lower suspension arm and one upper suspension arm, each of the suspension arms comprises a first end and a second end, the second end pivotally connected to the ground engaging member;
        the first end of the upper suspension arm is pivotally connected to the leaning frame; and
        one shock absorber operatively connected to the suspension connecting element and the lower or upper suspension arm, and
    the rear suspension assembly comprises at least one rear ground engaging member and is connected to the rear section of the undercarriage element;
    wherein
    the leaning frame is pivotally connected to the undercarriage element, such that the leaning frame and the two ground engaging members may tilt in a sideways direction relative to the undercarriage element, the rear ground engaging member and the rear suspension assembly;
    and, wherein the first ends of the lower suspension arms are pivotally connected to the leaning frame at a level above a level at which the leaning frame is pivotally connected to the undercarriage element.

2. The leaning vehicle according to claim 1, wherein each of the first ends of the lower suspension arms are pivotally connected to the leaning frame at opposite sides of a symmetry plane of the leaning frame.

3. The leaning vehicle according to claim 1 or 2, wherein the motor is arranged on the undercarriage element or is a part of the rear suspension assembly.

4. The leaning vehicle according to claim 1, wherein the shock absorber has an upper end operatively connected to the suspension connecting element and a lower end connected to the lower or upper suspension arm.

5. The leaning vehicle according to claim 1, wherein the suspension connecting element is a shock tower comprising a lower section and an upper section, the lower section substantially rigidly connected at the front section of the undercarriage element, and wherein the upper end of the shock absorber is pivotally connected to the upper section of the shock tower.

6. The leaning vehicle according to claim 1, wherein a lower end of the shock absorber is pivotally connected to the lower suspension arm.

7. The leaning vehicle according to claim 1, wherein the rear suspension assembly comprises a shock absorber.

8. The leaning vehicle according to claim 1, wherein the ground engaging members of the front suspension assembly and the rear ground engaging member are wheels, or wherein the ground engaging member of the front suspension assembly is at least two skis, and the rear ground engaging member is a drive belt.

* * * * *